United States Patent
Winkler

(10) Patent No.: US 10,354,221 B2
(45) Date of Patent: Jul. 16, 2019

(54) METHOD AND SYSTEM FOR PROGRESSIVE PICKING

(71) Applicant: SSI SCHÄFER PEEM GMBH, Graz (AT)

(72) Inventor: Max Winkler, Graz (AU)

(73) Assignee: SSI SCHÄFER PEEM GMBH, Graz (AT)

( * ) Notice: Subject to any disclaimer, the term of this patent is extended or adjusted under 35 U.S.C. 154(b) by 0 days.

(21) Appl. No.: 15/496,777

(22) Filed: Apr. 25, 2017

(65) Prior Publication Data

US 2017/0278055 A1   Sep. 28, 2017

Related U.S. Application Data

(63) Continuation of application No. PCT/EP2015/074731, filed on Oct. 26, 2015.

(30) Foreign Application Priority Data

Oct. 27, 2014  (DE) .......................... 10 2014 115 579
Oct. 26, 2015  (WO) ................. PCT/EP2015/074731

(51) Int. Cl.
*G06Q 10/08* (2012.01)
*G06Q 30/02* (2012.01)
(Continued)

(52) U.S. Cl.
CPC ......... *G06Q 10/087* (2013.01); *B65G 1/1373* (2013.01); *G06Q 30/0202* (2013.01); *G06Q 50/28* (2013.01)

(58) Field of Classification Search
CPC .. G06Q 10/087; G06Q 30/0202; G06Q 50/28; B65G 1/137; B65G 1/1373; B65G 1/1375
See application file for complete search history.

(56) References Cited

U.S. PATENT DOCUMENTS 9,760,086 B2 *   9/2017  Woodtli ............. G05B 19/4189
9,821,960 B2 *  11/2017  Issing ................. B65G 1/0407
(Continued)

FOREIGN PATENT DOCUMENTS

DE   10 2011 104511 B3   10/2012
DE   10 2013 101659 A1   8/2013
(Continued)

OTHER PUBLICATIONS

International Search Report and Written Opinion for corresponding Patent Application No. PCT/EP2015/074731 dated Feb. 4, 2016.

*Primary Examiner* — Kaitlin S Joerger
(74) *Attorney, Agent, or Firm* — Renner, Otto, Boiselle & Sklar, LLP

(57) ABSTRACT

A method and storage and picking system for progressive picking of articles in accordance with new orders which define ordered articles with regard to a respectively ordered article type including an associated quantity, characterized by a picking warehouse in which a plurality of different article types are stored, the different article types forming an article assortment, wherein the picking warehouse has a storage capacity ensuring a picking range of several days; a picking station for conventionally picking articles stored in the picking warehouse; a buffer warehouse in which selected article types are stored in storage units, and which has a storage capacity ensuring a picking range of a few days, wherein the buffer warehouse is filled by the selected article types, which substantially originate from the picking warehouse, in accordance with a filling order which is redetermined based on data of old orders representing completed picking orders, and which defines the selected article types including associated quantities thereof, wherein the data of the old orders comprise ordered article types including associated quantities as well as associated order times thereof; a picking control; and at least one work station and (Continued)

a consolidation-buffer device, wherein the work station is connected to the buffer warehouse, and wherein, at the work station, the ordered articles are taken from the storage units, and are packed, or are taken and delivered to the consolidation-buffer device; wherein the picking control is configured for cyclic generation of the filling order, wherein the generation comprises the following steps: selecting the article types, which have been ordered frequently and in greater amounts in the past, for the buffer warehouse from the data of the old orders; determining article-type-specific buffer quantities for each of the selected article types; and generating the filling order, which defines the selected article types including the associated buffer quantities thereof.

13 Claims, 11 Drawing Sheets

(51) Int. Cl.
*G06Q 50/28* (2012.01)
*B65G 1/137* (2006.01)

(56) References Cited

U.S. PATENT DOCUMENTS

| | | |
|---|---|---|
| 2002/0169657 A1 | 11/2002 | Singh et al. |
| 2008/0103874 A1 | 5/2008 | Zimmermann |
| 2008/0162270 A1 | 7/2008 | Kim et al. |
| 2010/0138275 A1 | 6/2010 | Bateni et al. |
| 2013/0177379 A1* | 7/2013 | Hoffman ............... B65G 57/00 414/791.6 |
| 2016/0052715 A1* | 2/2016 | Ogden .................. G06Q 10/08 700/216 |
| 2016/0229633 A1* | 8/2016 | Yamashita ........... B65G 1/1378 |
| 2016/0229634 A1* | 8/2016 | Yamashita ........... B65G 1/1378 |
| 2016/0347546 A1* | 12/2016 | Shakes ................. G06Q 10/08 |
| 2017/0185959 A1* | 6/2017 | Meurer ................ B65G 1/1378 |

FOREIGN PATENT DOCUMENTS

| | | | |
|---|---|---|---|
| DE | 10 2013 103869 A1 | 10/2014 | |
| WO | WO-2014170433 A1 * | 10/2014 | ........... B65G 1/1371 |

* cited by examiner

| CALC. DAY | A. TYPE | SUM | ORDER DAYS | PROBABILITY | VALUE | BUFFER PIECES |
|---|---|---|---|---|---|---|
| 01.12.2010 | 445290 | 215 | 11 | 100% | 1720 | 39,1 |
| 01.12.2010 | 436112 | 234 | 10 | 91% | 1638 | 46,8 |
| 01.12.2010 | 318317 | 146 | 10 | 91% | 1022 | 29,2 |
| 01.12.2010 | 465401 | 134 | 10 | 91% | 938 | 26,8 |
| 01.12.2010 | 459282 | 126 | 10 | 91% | 882 | 25,2 |
| 01.12.2010 | 458049 | 124 | 10 | 91% | 868 | 24,8 |
| 01.12.2010 | 423843 | 123 | 10 | 91% | 861 | 24,6 |
| 01.12.2010 | 447759 | 120 | 10 | 91% | 840 | 24,0 |
| 01.12.2010 | 458755 | 105 | 10 | 91% | 735 | 21,0 |
| 01.12.2010 | 363322 | 102 | 10 | 91% | 714 | 20,4 |
| 01.12.2010 | 441411 | 122 | 8 | 73% | 610 | 30,5 |
| 01.12.2010 | 428780 | 99 | 9 | 82% | 594 | 22,0 |
| 01.12.2010 | 458756 | 82 | 10 | 91% | 574 | 16,4 |
| 01.12.2010 | 321933 | 80 | 10 | 91% | 560 | 16,0 |
| 01.12.2010 | 424439 | 80 | 10 | 91% | 560 | 16,0 |
| 01.12.2010 | 439781 | 79 | 10 | 91% | 553 | 15,8 |
| 01.12.2010 | 415785 | 76 | 10 | 91% | 532 | 15,2 |
| 01.12.2010 | 448814 | 74 | 10 | 91% | 518 | 14,8 |
| 01.12.2010 | 363318 | 73 | 10 | 91% | 511 | 14,6 |
| 01.12.2010 | 363331 | 67 | 10 | 91% | 469 | 13,4 |
| 01.12.2010 | 330422 | 66 | 10 | 91% | 462 | 13,2 |
| 01.12.2010 | 435592 | 65 | 10 | 91% | 455 | 13,0 |
| 01.12.2010 | 363323 | 62 | 10 | 91% | 434 | 12,4 |
| 01.12.2010 | 363280 | 62 | 10 | 91% | 434 | 12,4 |
| 01.12.2010 | 150506 | 62 | 10 | 91% | 434 | 12,4 |
| 01.12.2010 | 441412 | 107 | 7 | 64% | 428 | 30,6 |
| 01.12.2010 | 391659 | 61 | 10 | 91% | 427 | 12,2 |
| 01.12.2010 | 102856 | 71 | 9 | 82% | 426 | 15,8 |
| 01.12.2010 | 396027 | 60 | 10 | 91% | 420 | 12,0 |
| 01.12.2010 | 121794 | 57 | 10 | 91% | 399 | 11,4 |
| 01.12.2010 | 458763 | 55 | 10 | 91% | 385 | 11,0 |
| 01.12.2010 | 456771 | 53 | 10 | 91% | 371 | 10,6 |
| 01.12.2010 | 110429 | 60 | 9 | 82% | 360 | 13,3 |
| ... | ... | ... | ... | ... | ... | ... |

Fig. 8      110

METHOD AND SYSTEM FOR PROGRESSIVE PICKING

RELATED APPLICATIONS

This is a continuation application of the co-pending international application WO 2016/066578 A1 (PCT/EP2015/074731) filed on Oct. 26, 2015, which claims priority of the German patent application DE 10 2014 115 579.3 filed on Oct. 27, 2014, both of which are incorporated fully by reference herewith.

BACKGROUND OF THE INVENTION

The present invention relates to a storage and picking system for progressive picking of articles in accordance with new orders, which define the ordered articles with regard to a respectively ordered article type including an associated quantity, wherein data of old orders are considered and evaluated. Further, the invention relates to a method for progressive picking as well as a method for cyclic filling a buffer warehouse. In particular, the invention deals with (progressively) arranging the articles in the warehouse region with foresight so that efficiency increases are possible.

RELATED PRIOR ART

With the commerce via the Internet (e-commerce) greater fluctuations within the article assortments (entirety of all different article types) of the vendors within short time intervals (days, weeks, or months) occur. Order structures (number of different article types and associated number of pieces/quantities per order) change at short notice, frequently, and are difficult to predict. During the Christmas season it is ordered, with regard to the quantity and bandwidth, for example more than in summer during the holiday season. While a new release of a bestseller can be sold well, i.e. fast and in huge quantities, at the beginning, the sale decreases with increasing time. After a certain time the new release is no longer a bestseller. The market is then saturated. However, possibly, it is in turn replaced by a new bestseller.

Imaging these fluctuations within the warehouse by re-organization (re-arrangement) of the articles is almost impossible. The e-commerce retailers need to design their storage and picking systems in accordance with the above-described peak loads (e.g., Christmas) which leads, in the remaining times of low loads, to an inefficient operation of the system at high overall investments.

Especially in the field of e-commerce the vendors are confronted with a very high number of different article types, or SKUs (stock keeping units), which are ordered over the year. It might happen that on one single day 20% of the annual demand of a specific article type is sold, and the remaining 80% are partially distributed over the rest of the year.

Further, day by day there are great fluctuations in the ordered article types. For example, today the article "A" sells particularly well, and tomorrow it does not sell at all. However, on the next day the article "B" sells particularly well. This means that, in particular in the field of e-commerce, steep ABC curves are typical. The respective daily ABC curves increase very steep. The problem is that the article-type-specific structures of the 20% portion (article A) and the 80% portion (articles B and C) of the ABC curve change daily. These daily changes do not allow imaging of the corresponding ABC distribution on a storage and picking region (e.g., short paths for the articles A and longer paths for the articles B and C). The re-organization effort with a static article provision were too enormous. However, the vendors need to be able to react flexibly to these fluctuating requirements.

Another problem is represented by the fluctuating order frequency of a respective article type, if observed over one year. This applies the more if a specific article type is ordered only in low and unpredictable quantities. For example, there might be days on which a specific article type is ordered up to 40 times, wherein this article type, however, is not ordered at all over 30% of the days. Also in this case it is not possible to organize, or distribute, the article assortment correspondingly in the warehouse region.

Still another problem is to be seen in strong load changes of the system within course of one day. For example, there are temporal order peaks in the evening time briefly after finish work because then many potential customers have the time for surfing in the Internet and putting orders, whereas during the regular work time there is no time for doing this. For facing these problems the vendors in turn need to design their storage and picking systems to the maximum load possible. Hence, the systems need to be designed correspondingly big with regard to picking performance in order to be able to compensate these maximum loads, which have a very short temporal duration only. During the remaining time the system is only used partially so that the cost-benefit aspect is negative.

Further, there are bigger fluctuations in the ordered quantities and in the order structures within the course of one month. As already indicated above, during the Christmas business, for example, a three-times higher quantity of articles is sold in comparison to other times. Also, during the Christmas business the probability is higher that the customers order many different articles at the same time, whereas in the remaining time often only one single article type (one liner/one order line) is ordered. For balancing out these fluctuations in turn high investment by means of a corresponding design of the system with regard to the maximum load, and a corresponding design with regard to heavily fluctuating order structures are required.

SUMMARY OF THE INVENTION

Therefore, it is an object of the present invention to provide a storage and picking system as well as a method for progressive picking which solve problems, in particular with e-commerce retailers, due to fluctuating order intensities and order structures.

It is disclosed a storage and picking system for progressive picking of articles in accordance with new orders, which define the ordered articles with regard to a respectively ordered article type including an associated quantity, wherein the system comprises: a picking warehouse in which a plurality of different article types is stored which form an article assortment for the purpose of picking, wherein the picking warehouse comprises a storage capacity ensuring a picking range of several days; a picking station for conventionally picking articles which are stored in the picking warehouse; a buffer warehouse in which selected article types are stored, preferably in storage units, and which has a storage capacity ensuring a picking range of some few days, wherein the buffer warehouse is filled with the selected article types, which substantially originate from the picking warehouse, in accordance with a filling order being cyclically determined newly based on data of old orders, which represent picking orders already completed in the past, and defining the selected article types including their associated quantities, wherein the data of the old orders comprise ordered article types including the associated quantities thereof as well as associated order times; a picking control; and at least one work station and a consolidation-buffer device, wherein the work station is connected, in terms of material flow, to the buffer warehouse, and wherein the ordered articles are taken at the work station, preferably from the storage units, and packed, or are taken and delivered to the consolidation-buffer device; wherein the picking control is configured for the cyclic generation of the filling order, wherein the generation comprises the following steps: selecting for the buffer warehouse the article types which have been ordered in the past frequently and in greater amounts, from the data of the old orders; determining article-type-specific buffer quantities for each of the selected article types; and generating the filling order which defines the selected article types including their associated buffer quantities.

The system of the present invention substantially distinguishes by a performance increase. The performance increase is achieved by pre-picking. A small part of the article assortment, which is typically stored in the long-term warehouse, is transferred into a buffer region, which is arranged separately thereto, and in particular with a composition which changes daily. The initial composition of the articles, which are transferred from the long-term warehouse into the short-term buffer, is determined fundamentally from an analysis of old orders, which have already been completed without utilization of the system and the concept of the present invention. Optionally, also new orders can be considered additionally, which have been received but which are not processed yet. Due to the pre-picking the path times in the region of the conventional warehouse are shortened by a transfer into the buffer warehouse.

Additionally, the vendors/system operators can react flexibly on requirements which change continuously and fast.

The buffer warehouse is filled by comparably few article types in relatively low quantities. The articles for the buffer warehouse are selected such that the buffer warehouse becomes empty automatically due to the continuous consumption (picking), preferably within a very short time (picking range). Also, the picking range of the buffer warehouse is very short, whereas the picking range of the picking warehouse is very big. Orders can be served from the picking warehouse over relatively long time periods (days, weeks, months) without filling, or replenishing, the picking warehouse. The buffer warehouse, in turn, should be re-filled as often and fast as possible. Since the buffer warehouse, almost completely, becomes automatically empty re-storing into the picking warehouse is not required. Also this aspect contributes to the performance increase. Less articles are moved within the system.

In the region of the work station one preferably operates in a batch-orientated manner. If the conventional batch size (time in which orders are selected for batch processing) in a conventional system is one to two hours the batch size is substantially increased with the invention.

Preferably, the step of selecting the article types comprises: determining the different article types contained in the data of the old orders; for each of the article types contained in the data of the old orders determining a temporal order frequency, preferably by quotient generation from a number of order-time units, during which the respective article type was ordered, and a number of order-time units, during which orders had been possible; for each of the article types contained in the data of the old orders determining a quantitative order frequency, preferably of the overall quantity; arranging the different article types in accordance with temporal and/or quantitative order frequencies, preferably considering temporal and/or quantitative threshold values; and selecting the temporal and/or quantitative article types occurring most frequently.

It is assumed that, if an article type in the recent past was ordered frequently, the same article type will also be ordered frequently within the next days. Therefore, the temporal and quantitative order frequency is determined, and subsequently the article types having the biggest order frequencies are selected for the buffer warehouse. In this context threshold values can be considered for excluding point-like "runaways" during the evaluation.

Preferably, the step of cyclically generating the filling order further comprises: determining a distribution of article-specific buffer quantities on the storage units.

Beside the weight and the volume of the articles further the volumes of the storage units as well as possible (compartment) separations of the storage units can be considered. Optionally, even limit values of such parameters, in particular with re-stocking, can be considered. In this manner it is prevented that, for example, during the re-stocking, in order to achieve complete storage units or complete compartments, too many articles of a specific article type are stored into the buffer warehouse. If too many articles are stored into the buffer warehouse, the probability increases that the buffer warehouse does not become empty automatically.

If a specific article type remains within the buffer warehouse over the actual picking range an active storing back of this article type from the buffer warehouse into the picking warehouse might be required, if the occasion should arise. The storing back requires time. Remaining stocks, which remain in the buffer warehouse, block the space for new article types which were actually to be stored into the buffer warehouse in accordance with future filling orders. This is not desired. Therefore, the filling of the storage containers is optimized.

Preferably, even the distribution of the article-type-specific buffer quantities on the storage units is determined while article-type-specific volumes and weights as well as storage-unit-specific dimensions are considered. Optionally, corresponding limit values in turn can be considered.

In a particular embodiment the article-type-specific buffer quantities for the selected article types are determined by multiplying article-type-specific average filling numbers by the picking range of the buffer warehouse.

In particular, the buffer warehouse has a fixed physical size corresponding to a fixed number of (preferably uniform) storage units which can be received at maximum by the buffer warehouse, wherein the fixed number of storage units is preferably determined by a further analysis of several data sets of old orders.

The physical size of the buffer warehouse is determined, as a rule, only one single time, namely during the initial design of the system. The buffer warehouse can be formed scalable, however, it is desired to operate the buffer warehouse as long as possible without architectural changes. Hence, the operator/vendor should initially decide a certain buffer size. The buffer size in turn should be small in comparison to the size of the picking warehouse, because the buffer warehouse has a picking range of some few days only. The picking range is to be understood as a time duration within which a number of orders can be supplied with articles from a warehouse without replenishing the warehouse. It is recommended to calculate the respective buffer assortment, filling of which changes cyclically, for many cycles (cycle duration preferably is one day), in order to be able to form an average value which deals with each requirement. Of course, peaks can occur again and again in the future which actually require a bigger buffer warehouse. However, it happens again and again that the buffer warehouse is oversized in comparison to the current demand. A compromise is found here.

In another particular embodiment the picking control is further configured to classify the new orders into buffer-warehouse-pure, mixed, and picking-warehouse-pure new orders, wherein the buffer-warehouse-pure and mixed new orders are processed at the work station, and wherein the picking-warehouse-pure new orders are processed at the picking station. Here again the path-time optimization expresses. Articles which are needed frequently are preferably served from the buffer which particularly holds A articles. The remaining articles are picked from the conventional warehouse.

Further, it is advantageous if the buffer warehouse comprises a storage-unit storage device, in particular a conveying-system circle on which the storage units, which are preferably stacked on top of each other, circulate endlessly, or a horizontally circulating carousel rack.

In addition, a packing station can be provided.

Preferably a filling-order generation cycle is one (working) day.

Further, it is advantageous if the consolidation-buffer device is a shelving, a flow rack, a pick-to-bucket arrangement, or an endlessly circulating tray sorter, and comprises a picking-guidance system.

Additionally, it is advantageous if the picking control is further configured to perform a storage-location administration, a picking guidance, and an order administration, as well as to cause filling of the buffer warehouse with the articles of the selected article type.

Further it is disclosed a method for progressive picking of articles in accordance with new orders in a storage and picking system in accordance with the invention, comprising the following steps: analyzing a plurality of new orders with regard to contained article types; classifying the analyzed new orders into: buffer-warehouse-pure new orders containing only article types which are stored in the buffer warehouse; mixed new orders containing article types which are stored in the buffer warehouse and in the picking warehouse; and picking-warehouse-pure new orders containing the article types which are stored in the picking warehouse only; at the work station order-orientated processing of the article types which are stored in the buffer warehouse and which are contained in the buffer-pure and mixed new orders by removing, preferably from the corresponding storage units, for the purpose of direct subsequent packing, or by removing and order-orientated collecting in the consolidation-buffer device; order-orientated removing of the article types contained in the mixed new orders and stored in the picking warehouse only, and order-orientated merging with the corresponding article types from the work station; and processing the picking-warehouse-pure new orders by removing the article types from the picking warehouse for the purpose of direct subsequent packing.

The concept of the invention distinguishes in that the orders are classified into three categories. The categories decide where, or how, a corresponding order is processed.

Preferably, the method further comprises the steps of: generating a filling order in accordance with the above-mentioned steps; and transferring articles, which are determined by the filling order with regard to an article type and an associated quantity, from the picking warehouse into the buffer warehouse.

In particular, the method comprises the steps of: determining a current filling of the buffer warehouse before the buffer warehouse is to be filled in accordance with the filling order; comparing the current filling state with a desired filling state corresponding to the filling order; determining a difference between the current filling state and the desired filling state; determining an adapted filling order which corresponds to the difference; transferring the articles which are determined by the adapted filling order from the picking warehouse into the buffer warehouse; and filling and replenishing the storage units with the articles.

BRIEF DESCRIPTION OF THE DRAWINGS

It is clear that the above-mentioned and hereinafter still to be explained features cannot be used in the respectively given combination only but also in different combinations or alone without departing from the scope of the present invention.

Embodiments of the invention are depicted in the drawings and will be explained in more detail in the following description, wherein:

FIG. 8 shows a table of the order frequencies of FIG. 7 in order to explain a filling order for the buffer warehouse;

PREFERRED EMBODIMENTS OF THE INVENTION

Figure 1:
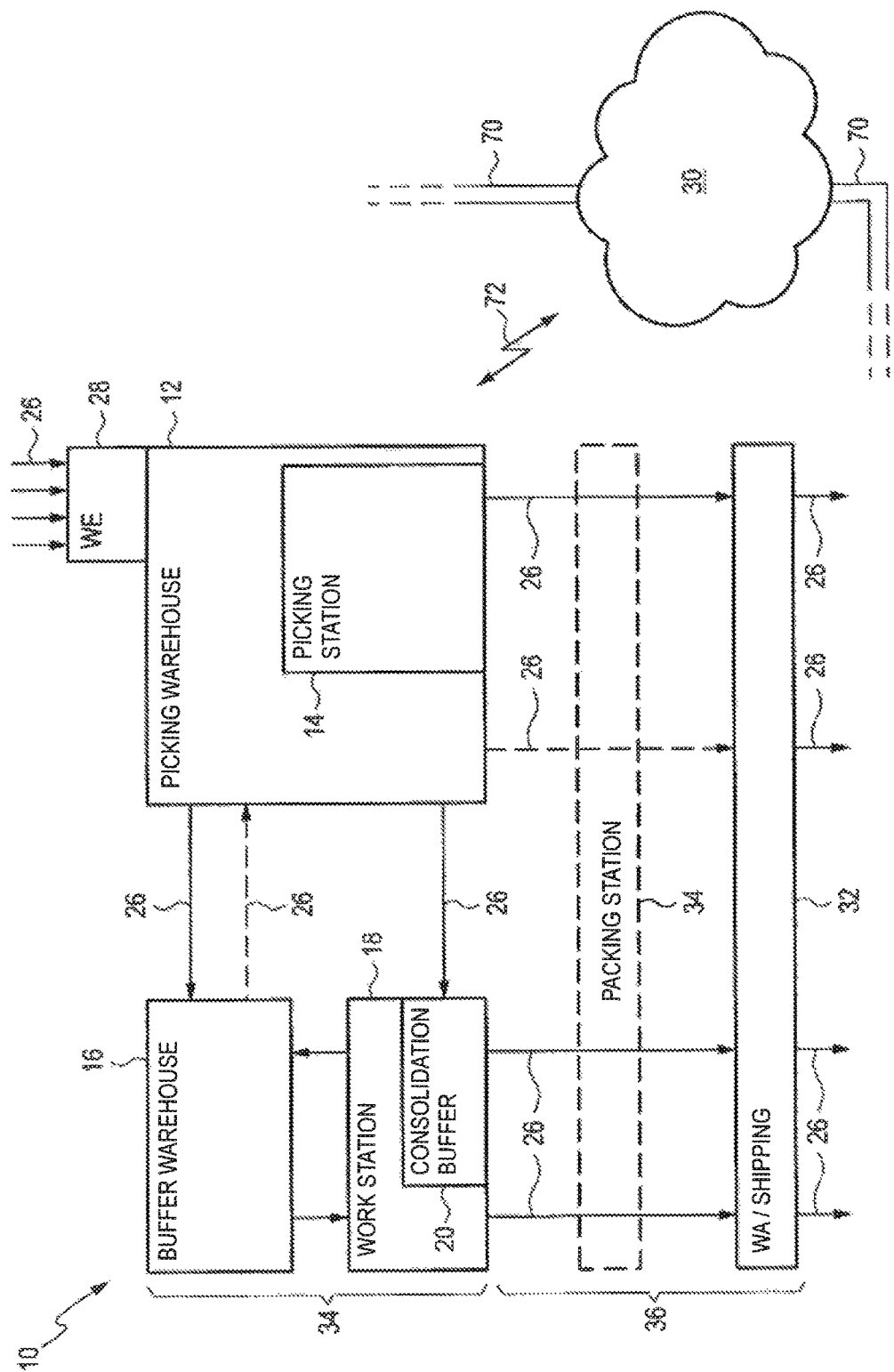
FIG. 1 shows a block diagram of a storage and picking system in accordance with the invention.

If vertical or horizontal orientations are mentioned in the following it is clear that elements and features being associated with these orientations can be exchanged against each other at any time by a corresponding rotation so that such orientations are not to be understood in a limiting manner. Further, same parts and features are provided with the same reference numerals. Disclosures, which are contained in the description, are transferable roughly on same parts and features having the same reference numerals. Position and orientation indications (such as "on top", "at the bottom", "lateral", "longitudinal", "horizontal", "vertical", and the like) are related to the figure which is just described. If the position or orientation is changed these indications are to be transferred roughly to the new position and orientation.

As usual in the field of (intra) logistics, in storage and picking systems (distribution systems, material-handling systems, etc.) a longitudinal direction is designated by "X", a transversal direction is designated by "Z", and a height direction is designated by "Y". The directions X, Y, and Z preferably define a Cartesian coordinate system.

FIG. 1 shows a block diagram of a storage and picking system 10 in accordance with the invention.

The storage and picking system 10 (hereinafter also briefly called "system 10") comprises a picking warehouse 12, at least one picking station 14, a buffer warehouse 16, and at least one work station 18 having a consolidation buffer, or a consolidation-buffer device, 20. The picking warehouse 12 is a conventional warehouse configured for conducting a conventional picking as it will be explained in more detail below. The picking warehouse 12 has the function of a long-term warehouse dedicated to articles 22 (not shown), and serves as supply warehouse dedicated to the buffer warehouse 16. In the picking warehouse 12 an entire article assortment 24 (not shown) is stored. The picking warehouse 12 can be implemented exemplarily by shelvings, an automated small-part warehouse (ASPW), flow racks, carousel racks, or similar. The buffer warehouse 16 has the function of a short-term warehouse dedicated to the articles 22. In the buffer warehouse 16 only a very little part of the article assortment 24, preferably the "best" articles, or items, A, are provided temporarily. The buffer warehouse 16 is preferably dimensioned such that 1-10%, in particular 1.5-6%, of the article types 46 (FIG. 2) of the entire article assortment 24 are actually stored in the buffer warehouse 16.

In the following an "article" is to be understood as a stock unit, or picking unit, within the storage and picking system 10. The picking unit, which is also called storage good, can include a storage-load support as well as the article 22 itself. The picking unit, however, can also include the article 22 only, if no storage-load support is present. For example, pallets, containers, cartons, trays, (overhead) bags, or the like are used as (storage) load supports. An "article" is to be understood, in particular, as a piece good. The articles 22 are (smallest) units of the article assortment 24 which can be distinguished by the article type 46 (cf. FIG. 2). Piece goods are individualized distinguishable articles, which can be handled individually and stock of which is kept piece by piece or as a case. A "case" is a general term for a unit which can be handled and which can be moved manually or by means of technical equipment (such as conveying system, rack servicing device, load-handling device, etc.). The terms "article", "case", "storage good", "picking unit", "stock unit", and "piece good" are used equivalently in the following.

For moving the articles 22 within the system 10 different types of conveyors can be used (such as roller conveyors, belt conveyors, chain conveyors, overhead conveyors, strap conveyors, belt conveyors, etc.) which are not shown in FIG. 1. The terms "conveyor" and "conveying system" are used equivalently in the following. A conveying system substantially includes all technical and organizational devices (such as drives, sensors, switches, controlling elements, etc.) for moving or transporting the articles 22 and for steering material and article flows 26.

The article flows 26 are indicated by means of arrows in FIG. 1. The articles 22 enter the system 10 through a goods receipt (WE) 28. The goods receipt 28 is connected, in terms of material flow, to the picking warehouse 12. The articles 22 are taken in at goods receipt 28 and subsequently stored in the picking warehouse 12. If necessary the articles 22 can also be stored directly from the goods receipt 28 into the buffer warehouse 16. However, the articles 22 in the buffer warehouse substantially originate from the picking warehouse 12. A small part of the articles 22 is retrieved cyclically from the picking warehouse 12 with a permanently changing composition (article type and quantity) and is stored into the buffer warehouse 16 in accordance with a filling order. The moved articles 22 are then present in both the picking warehouse 12 and the buffer warehouse 16. Normally, storing the articles 22 back from the buffer warehouse 16 into the picking warehouse 12 does not occur. Normally, the articles 22, which have been transferred into the buffer warehouse 16, are "consumed" in the region of the buffer warehouse 16". Only in exceptional cases remaining articles are stored back from the buffer warehouse 16 into the picking warehouse 12, as indicated by means of a dashed-line arrow.

In the picking warehouse 12 the conventional picking is conducted, preferably of articles B and/or C. A spatial arrangement/distribution of the articles 22 in the picking warehouse 12 is performed, for example, dependent on their access frequencies. The access frequency as such is typically categorized. The "access frequency" is to be understood generally as a number of requirements for an article type 46 per time unit. Categorization, or classification, can also be conducted alternatively dependent on sale quantities, transfer frequencies, or other criteria. In this context one also speaks of the ABC distribution as mentioned at the outset. Sortation, or arrangement, of the article assortment 24 according to access frequencies can be expressed by a so-called Lorenz curve. The term "Pareto" distribution is used analogously. It is usual that the spatial arrangement and distribution of the articles 22 of the article assortment 24 is already considered during a planning phase of the picking warehouse 12 and is correspondingly implemented later. Therefore, it is extremely difficult to react on situations when the access frequencies of the articles 22 of the assortment 24 change frequently and/or in short terms during an operation of the system, as it is particularly the case in the field of e-commerce.

"Fast movers" and "slow movers" are to be understood hereinafter as articles A, and articles B or C of the article assortment 24. Articles A have high sale quantities, transfer rates, or access frequencies, where articles C have low ones. The boundaries between articles A, B, and C are determined individually. It is clear that the slow movers can also be extended by the average movers ("articles B").

E-commerce retailers often have a very huge article assortment 24 (30,000 to 200,000 different article types 46 are not exceptional). A probability that an access frequency of one of the article types 46 changes is high, because in e-commerce the access frequencies of the articles change by customers behaviours (hypes), or are controlled by advertisement or special-price actions. A further aspect is to be seen in buying occasions (partially deliberately used in terms of advertisement) such as Christmas, Eastern, Mother's day, Father's day, Valentine's day, start of holidays, start of the school year, or the like. During an offering phase the access frequency to one of the article types 46 which is just offered, as a rule, will be higher as during a phase in which the same article type 46 does not have a special price.

Conventional storage and picking systems are not capable of reacting sufficiently flexible and in short terms on fluctuations of access frequencies of the articles 22 of the assortment 24. In particular with e-commerce applications the following difficulties arise which are listed below:

Shipping must happen on the same day when an order is received, wherein a time at which an order is possible at the latest can be very short before the actual delivery.

ABC structure often and frequently changes with regard to the involved article types.

In general very various article assortments can be present (e.g., from small-part fashion accessories up to huge pieces of furniture or heavy machines such as washing machines).

Extreme peak loads exist (e.g., during the pre-Christmas time, before Eastern, or the like).

Many deliveries are returned (for example, because shoe size does not fit). These return goods need to be re-integrated again into the system for allowing reshipping according to a different order.

Customers' wishes are difficult to predict.

Fast return-of-invest (ROI) is desired by the system operators/vendors.

The conventional picking of the articles 22 of the picking warehouse 12 of FIG. 1 happens at one or more picking stations 14. In FIG. 1 the picking station 14 is arranged in the region of the picking warehouse 12. It is clear that the picking station(s) 14 can also be arranged remote from the picking warehouse 12. It can be picked in accordance with different principles.

Nowadays one distinguishes roughly between two different picking principles according to which the picking stations 14 can be operated. It is either picked in accordance with the "man-to-goods" principle, or in accordance with the "goods-to-man" principle. The present invention can be operated in accordance with each of the principles, even in combination, wherein a picking person (not shown) gets assisted as far as possible. The picking can be conducted either manually or in an automated manner.

With the conventional picking it is often picked in accordance with the principle "man-to-goods". In this context the picking person moves, for the purpose of picking, within a (decentral) region of the warehouse 12, wherein provision units (such as storage containers, trays, cartons, pallets, etc.) are stored and provided at stationary locations within the warehouse 12 at access locations. In accordance with a picking order 40 the articles 22, which are dictated by a customer, are arranged with regard to type 46 and quantity by collecting the same. The picking person removes the desired article(s) 22 and puts the same into a collecting device (vehicle, container, carton, etc.).

Alternatively, with the "goods-to-man" principle the to-be-picked articles 22 are transported towards the picking person so that the picking person, which is also called "picker" in the following, for the sake of better ergonomics needs to walk as less as possible, or not at all, for conducting a picking process (removing the articles from a source and delivering to a target). The to-be-picked articles 22 are transported within the system 10, in particular from and to the picking stations 14. In this case systems having dynamic article provision are used, wherein the picking person typically occupies a spatially-fixed picking station 14 and is there supplied with the articles 22 via a conveying system.

Alternatively, storage containers 80 can stand statically in racks, and collecting devices dedicated to the orders can pass the storage containers within the rack dynamically. The collecting devices can be realized by order containers on a conveying system, or by trays of a tray conveyor which are tilted at the end of the conveying line into the order container.

Additionally, a plurality of different picking-guidance strategies exist which are designated by terms such as "pick-to-belt", "pick-by-light", "put-to-light".

The picking-guidance strategy, or picking guidance, "pick-by-light" offers significant advantages compared to classic manual picking techniques. With pick-by-light systems a signal lamp having a number display, or even an alphanumerical display, as well as at least one confirmation button, and possibly input or correction buttons, is provided at each access location (source). If an order container, into which articles 22 are put, arrives at a picking position then the signal lamp is illuminated at the respective access location (source) from which the articles 22 are to be removed. The to-be-removed quantity appears on the display. The removal is then confirmed by means of the confirmation button, and the change of stock can be signaled back to a warehouse management system 62 (FIG. 2) in real time. Pick-by-light systems often are operated in accordance with the principle "man-to-goods". With "put-to-light" systems the destination, or location, or delivery location, is indicated optically.

Further, paperless picking is possible in the picking warehouse 12 by means of "pick-by-voice". In this case communication occurs between a picking control 30 (data-processing system) and the picking person by means of voice. Instead of printed picking lists, or data-transmission terminals (i.e. mobile data-detecting units, MDU) most times the picking person works with a headset (earphone and microphone) which can be connected, for example, to a commercially available pocket PC. The orders 40 (FIG. 2) are transmitted by means of radio, most times by means of WLAN/WiFi, from the warehouse management system 62 to the picking person.

Further, with picking it is distinguished, due to the selected strategy, between order-related picking and article-related picking, wherein the collection of the articles 22 can either occur serially, i.e. one after the other, or in parallel, hence at the same time. With order-related picking one order 40 is processed completely, i.e. each article 22 of the order 40 is collected serially. By contrast, with article-related picking several orders 40 are processed in parallel by the picking person which respectively collects, and searches, only a portion of the orders 40, namely the article which is just to be processed.

As the picker actually does not need to walk anymore with the "goods-to-man" principle, because the to-be-picked piece goods are transported directly towards him/her, the customer orders, or picking orders, are frequently processed in parallel, which is called "batch picking". With "batch picking" several customers orders are concatenated in an article-orientated manner so that as few as possible SKUs (stock keeping unit) need to be retrieved from one of the warehouses 12 or 16 and need to be moved back into the warehouse 12 or 16 after a completed picking process. With the article-orientated analysis of the orders 40 a group of customer orders is observed which contains each order (order lines) being related to a specific article type 46 and then an article-orientated transport orders for the SKUs is generated. The SKU corresponding to this respective article type 46 is then retrieved and transported to the station 14 or 18. At the station 14 or 18 the picker grabs each of the articles 22 of the respective article type 40 and delivers the same in the predetermined number to correspondingly provided target locations. This process is also called "removal", independent of whether the articles 22 are provided with or without load support.

Each target, or each target location, has assigned one of the picking orders 40 so that the delivery of the articles 22 occurs in an order-orientated manner. The target locations are kept at the stations 14 or 18 as long as each of the article types 46 of the associated picking order 40 has been delivered to the target location. In this context one also generally speaks of a two-stage picking process.

Figure 4:
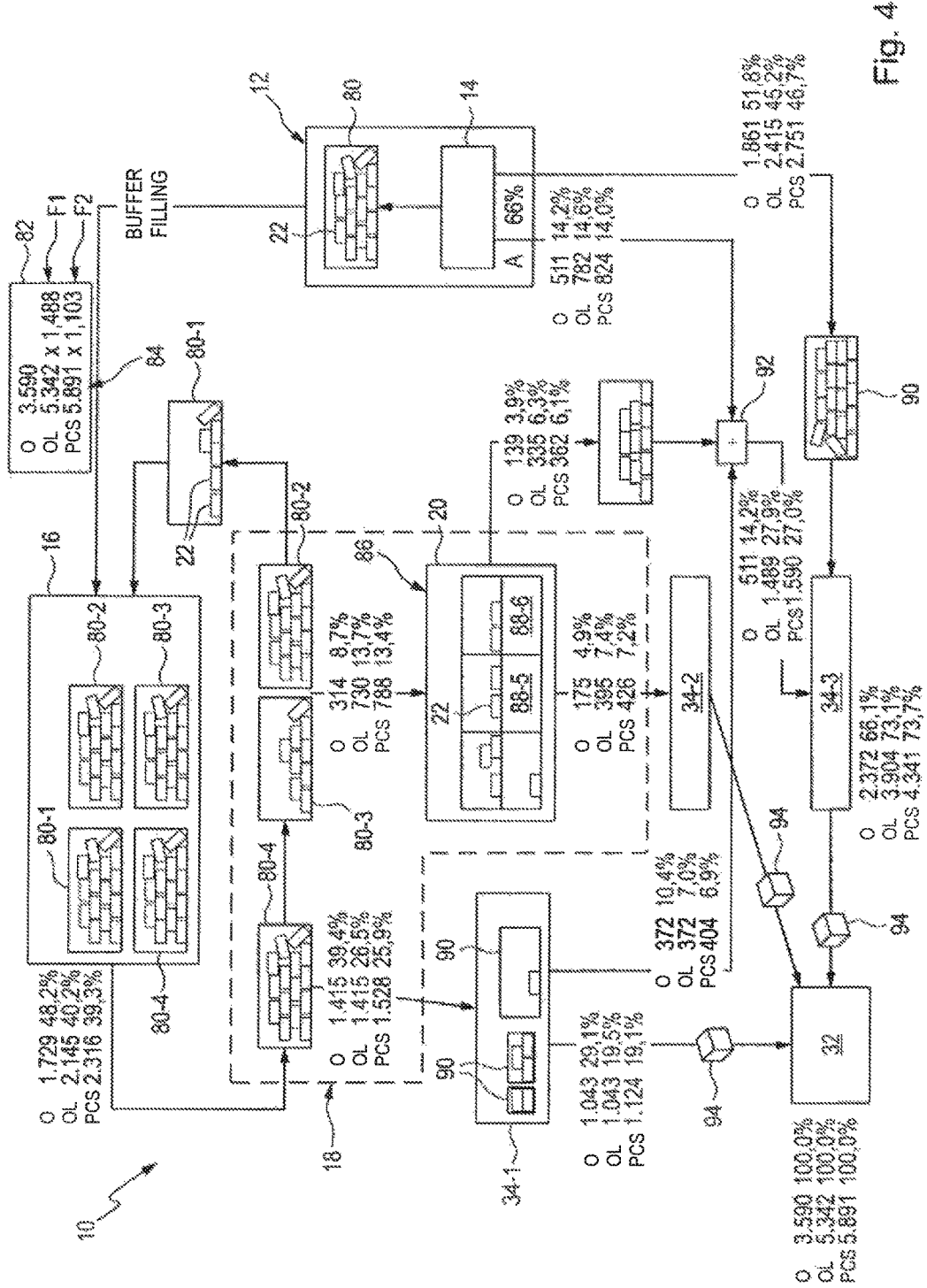
FIG. 4 shows a block diagram for illustrating a flow of articles.

The manner according to which picking is performed in the system 10 can depend on many factors. One factor which might play a role is the average order structure 84 (FIG. 4). It makes a difference whether different articles 22 are to be picked in small quantities, or whether the same articles 22 are to be picked in bigger quantities again and again.

Returning to FIG. 1, if the picking process is completed at the work station 18 and/or the picking station 14, the completely picked articles 22 are transferred to the goods issue (WA), or shipping, 32 from where the articles 22 begin its travel to the customers. Also, one or more packing stations 34 can be provided optionally where the completely picked articles 22 are packed and/or re-packed into shipping supports (not shown). In FIG. 1 an exemplary packing station 34 is shown by means of a dashed line between storage and picking region 34 and packing and shipping region 36.

Figure 2:
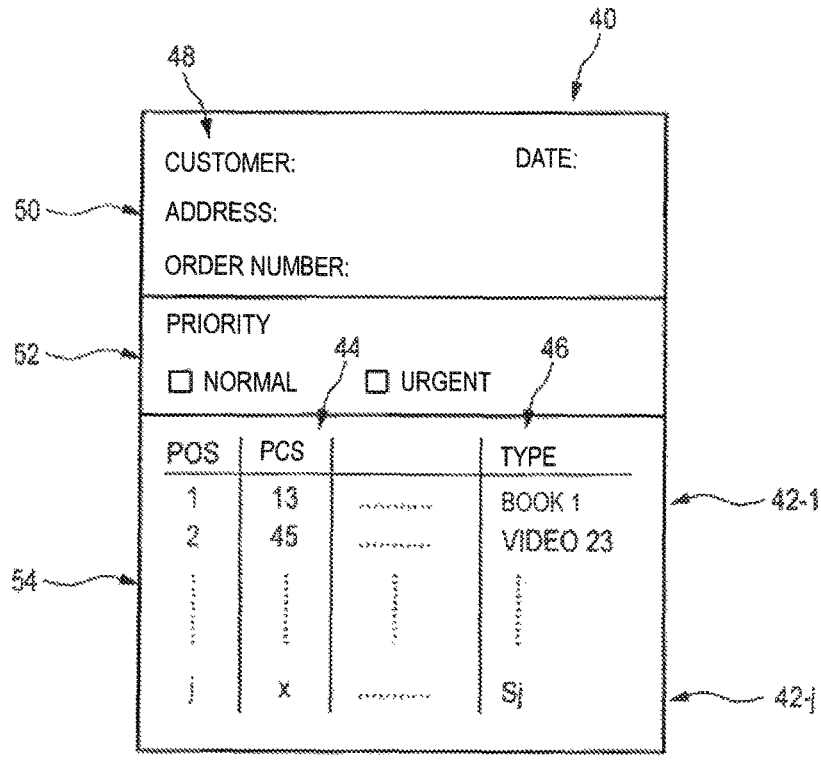
FIG. 2 shows a block diagram of an exemplary order, or order-data set.

In FIG. 2 an exemplary picking order 40 is shown. The (picking) "order" 40 consists of one or more order positions which are also called order lines 42. Each of the order lines 42 indicates a respective number of pieces/quantity 44 of one article type 46 which has been ordered by a customer 48. An old order 40 is an order 40 which has already been processed in the past, i.e. completed and finished. A new order 40 is an order 40 which is to be processed in the future.

The orders 40 are provided as data sets. Each of the data sets can comprise a header field 50, an (optional) priority field 52, and/or an article field 54. The header field 50 can comprise amongst other things information related to the customer 48 who has put an order, a (customer) address, or a (customer) identification number as well as an order number. The priority field 52 contains information on whether it is a normal order or an urgent order. An urgent order is an order 40 having high (processing) priority which is typically handled prior to normal orders 40. The article field 54 comprises the order lines 42. Each of the order lines 42 comprises at least one information on the associated quantity 44 of an ordered article 22, and on an article type 46 thereof.

Coordination of the processing of the order 40 is taken over by an order-processing system, or an order administration, 56 (FIG. 3) which in most cases is integrated into the picking control 30, which can comprise, for example, a resource planning system 58 as well. The order processing is typically performed in a computer-aided manner by means of the order-processing system 56.

Figure 3:
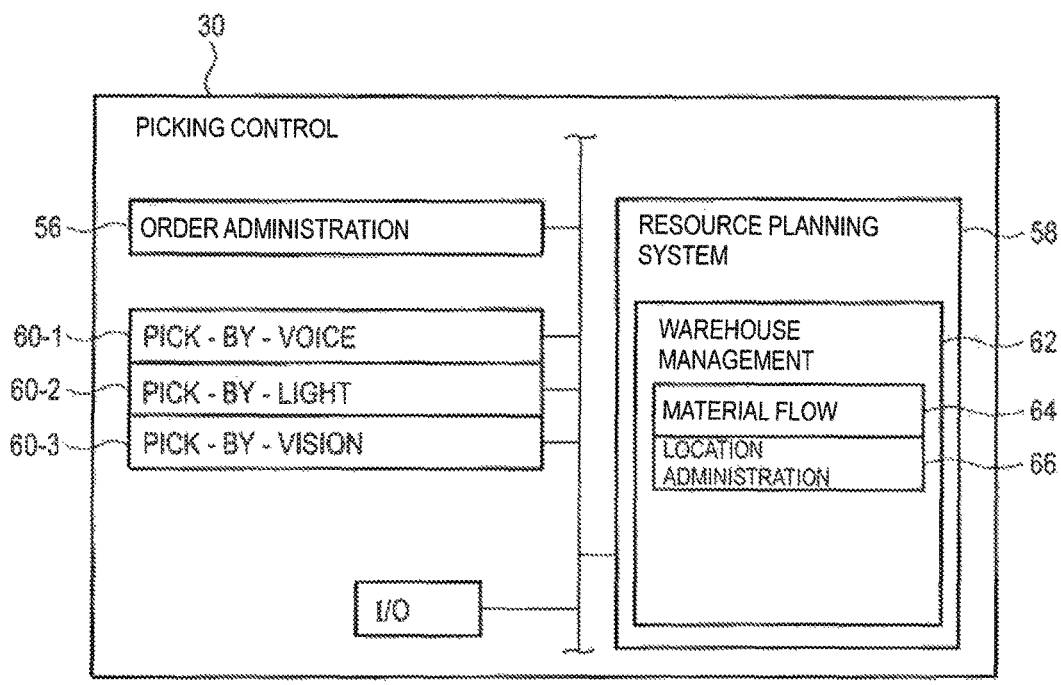
FIG. 3 shows a block diagram of an exemplary picking control.

FIG. 3 shows a block diagram of the picking control 30. The picking control 30 can have integrated further a (storage-) location administration 66 as well as an information display. The picking control 30 is typically realized by a data-processing system which is preferably operated in an online operation for delay-free data transmission and data processing. The picking control 30 can comprise a centralized or decentralized structure. The picking control 30 can be structured modularly, and can implemented the following functions: the order administration 56, the implementation of the picking-guidance strategies 60, the resource planning system 58 which in turn can include the warehouse management 62 which in turn can include the material flow 64 as well as the (storage-) location administration 66, and/or an interface administration 68. These functions can be implemented in terms of software and/or hardware. Communication can be conducted via lines 70 or wirelessly (arrow 70), as shown in FIG. 1.

The order administration 56 of FIG. 3 is responsible for distribution of (picking) orders 40, which are coming in from customers 48, in order to be completed (processed) at the stations 14 and/or 18. At the station 14 factors such as capacity utilization, quantity-assortment distribution, (conveying) path optimization, and the like are relevant. The stations 14 and 18 can have assigned entire orders 40 for processing, but also only partial orders. However, it is not required that each of the article types 46 of a picking order 40 is picked at the same station 14 or 18.

FIG. 4 shows a block diagram for illustrating an article flow, or material flow, in an exemplary system 10 which can be structured like the system 10 of FIG. 1. For facilitating the illustration the elements of the system 10 of FIG. 1 not each element is illustrated in FIG. 4. For example, the goods receipt 28 is lacking.

In FIG. 4 the material flow, or the article flow, is indicated by means of arrows between the involved blocks. The source of each article 22 in the system 10 is represented by the picking warehouse 12. Within the corresponding block an exemplary storage unit is shown in terms one (single) storage container 80. It is clear that a plurality of storage containers 80 is used in the warehouse 12. One storage unit represents a unit which serves for stocking the articles 22. However, the storage unit also is an arithmetical standard quantity for expressing the physical size of the warehouses 12 and 16. Preferably, the same storage units are used in the warehouses 12 and 16.

Preferably, the articles 22 are stored in an article-type-pure manner in the storage containers 80. This means that the storage containers 80 respectively store only articles 22 of one single article type 46. It is clear that other storage-load supports can be used such as trays, bags, cartons, pallets, or the like. Racks, rack arrangements, or other storing devices for providing the storage containers 80 are not shown for the sake of a simplified illustration. The picking station 14 is arranged, in the present case, within the region of the picking warehouse 12. At the picking station 14, for example, picking is performed manually in accordance with the man-to-goods principle since the picking persons drive or walk through the picking warehouse 12 together with picking carts. The picking carts (not shown) are filled, for example, with order containers (not shown). The picking persons remove the articles 22 from the storage containers 80 and put the same into the order containers. The removal and delivery, i.e. the picking, happens in accordance with the picking orders 40, e.g., by means of pick-by-voice.

The block 82 serves for illustrating an order structure 84. The order structure 84 shown in FIG. 4 exemplarily comprises 3590 orders (O). These 3590 orders are formed by 5342 order lines (OL). The 3590 orders define 5891 pieces (PCS), wherein one (single) piece equals one stock unit, or one article 22. The factors F1 and F2 express ratios between the orders 40, order lines 42, and the quantities 44. In the present case the factor F1 is about 1,49 and indicates an average number of order lines 42 per order 40. In the present case, the factor F2 is about 1,1 and indicates an average quantity 44 per order line 42. Both factors F1 and F2 have a magnitude of 1, and therefore are comparably low. The magnitude of 1 indicates that the order structure 84, which is observed here, originates from the field of e-commerce (B2C, business-to-customer). With B2B (business-to-business) applications the factors F1 and F2 were significantly higher.

In the buffer warehouse 16 of FIG. 4 four storage containers 80-1 to 80-4 are exemplarily shown. It is clear that the (overall) number of storage containers 80 in the buffer warehouse 16 is limited by the physical size of the buffer warehouse 12. The selection of dimension of the buffer warehouse 16 will be explained in more detail later.

The buffer warehouse 16 supplies the work station 18 with the storage containers 80-1 to 80-4. In FIG. 4 circulation of the storage containers 80-1 to 80-4 is shown, since the storage containers 80 can be guided through the region of the work station 18 several times a day, in particular if the orders 40 are processed in blocks. In FIG. 4 a snapshot is shown where the storage container 80-1 has already passed the work station 18 and has been stored back while the storage containers 80-2 to 80-4 are still in the region of the work station 18 and are processed. The storage containers 80-2 and 80-3 are in the region of the consolidation-buffer device 20 for processing multi-line orders 40.

In the present case the consolidation-buffer device 20 is exemplarily implemented as a rack 86 having rack compartments 88. Four of the six rack compartments 88 are already filled by articles 22 which can belong to different article types 46. The rack compartments 88-5 and 88-6 are (still) empty. It is clear that one or more rack compartments 88 can be provided in the rack 86. Each of the rack compartments 88 has assigned one of the orders 40. The overall number of the rack compartments 88, or the target (buffer) locations, can be determined in advance, as will be explained in more detail below. Typically, 20 to 100 buffer locations are provided. In the region of the rack 88, or the consolidation buffer 20, one preferably works in accordance with "pick-by-light" and "put-to-light" guidance strategies.

The storage container 80-4 is also located within the region of the work station 18. The articles 22 are directly removed from the storage container 80-4, are not buffered, but are directly packed, as will be explained below, because they represent single-line orders 40.

The above-mentioned circulation serves the processing of "buffer-warehouse-pure" and "mixed" orders 40. These orders 40 constitute 48.2% of all orders 40 in the example of FIG. 4. This corresponds to 40.2% of the order lines 42, or 39.3% of the quantities 44.

66% of all orders 40 represent "picking-warehouse-pure" and "mixed" orders 40. This is indicated in FIG. 4 by the article flows, depicted at the right-hand side, which leave the picking warehouse 12 downwards towards a packing station 34-3 and a merging point 92.

34% of all orders 40 represent "buffer-warehouse-pure" orders 40.

14.2% of all orders 40 represent "mixed" orders. 14.2% of all orders 40 thus require both articles 22 stored in the picking warehouse 12 and articles 22 stored in the buffer warehouse 16.

51.8% of all orders 40 represent "picking-warehouse-pure" orders 40, i.e. thus require article 22 from the warehouse 12 only.

29.1% of all orders 40 comprise one single order line 42 only. These single-line orders 40 are served from the storage container 80-4 which can also be used later for the processing of multi-line orders 40. In the example of FIG. 4 1043 orders in total have one line, which require 1124 pieces in total. This means that some of the single-line orders 40 require more than 1 piece. The articles 22 are removed in an order-orientated manner, i.e. in the right number of pieces, from the storage container 80-4 and are put into corresponding shipping containers 90 (such as cartons, collecting containers, pallets, etc.).

The packing of single-line orders 40 is conducted in FIG. 4 in the region of the packing station 34-1. There, for example, three shipping containers 90 are shown which are respectively loaded with a different number 44 of articles 22. Although the packing station 34-1 is illustrated separately from the work station 18 it is clear that the steps of removing, repacking, and packing can each be conducted in the region of the work station 18. This means with other words that the packing station 34-1 can be integrated into the work station 18. The same applies with regard to the packing station 34-2 which is used for completing the orders 40 comprising several order lines 42 having different article types 46, wherein each article type 46 is stocked in the buffer warehouse 16.

4.9% of all orders 40 have multiple lines and are supplied exclusively from the warehouse 16.

3.9% of all orders 40 are also pre-picked via the consolidation buffer 20 for being merged later with the articles 22 from the picking warehouse 12 and with the (single-line) articles 22. The articles 22 of the mixed orders 40 which originate from the buffer warehouse 16 and the picking warehouse 12 are merged at the point 92 and packed as well as made ready for shipping at the packing station 34-3. It is clear that the packing station 34-3 in turn can be integrated into the work station 18.

The completely picked and packed, ready for shipping, single-line, buffer-warehouse-pure orders 40 (29.1%) leave the system via the goods issue 32, for example, in parcels 94. The same applies with regard to the multi-line buffer-warehouse-pure orders 40 (4.9%) which arrive from the packing station 34-2. The mixed orders 40 (14.2%) and the picking-warehouse-pure orders 40 (51.8%) arrive from the third packing station 34-3 (66%).

It is clear that also only one single packing station 34 can be provided which can be arranged within, or outside, the region of the work station 18. FIG. 4 merely shows an exemplary embodiment of the system 10.

Thus, 48.2% of all orders can be served from the buffer warehouse 16. Only 51.8% of all orders still need to be picked conventionally from the picking warehouse 12. For achieving a corresponding efficiency, or a corresponding capacity utilization, of the buffer warehouse 16, or load reduction of the picking warehouse 12, the way the buffer warehouse 16 (filling order) is filled by the article types 46, and the physical size of the buffer warehouse 16 need to be selected very carefully. This applies the more because the buffer warehouse 16 has a very much smaller capacity (variety of article types and quantities) than the picking warehouse 12. The filling of the buffer warehouse 16 will be explained in more details with reference to the FIGS. 7 and 8.

Figure 5:
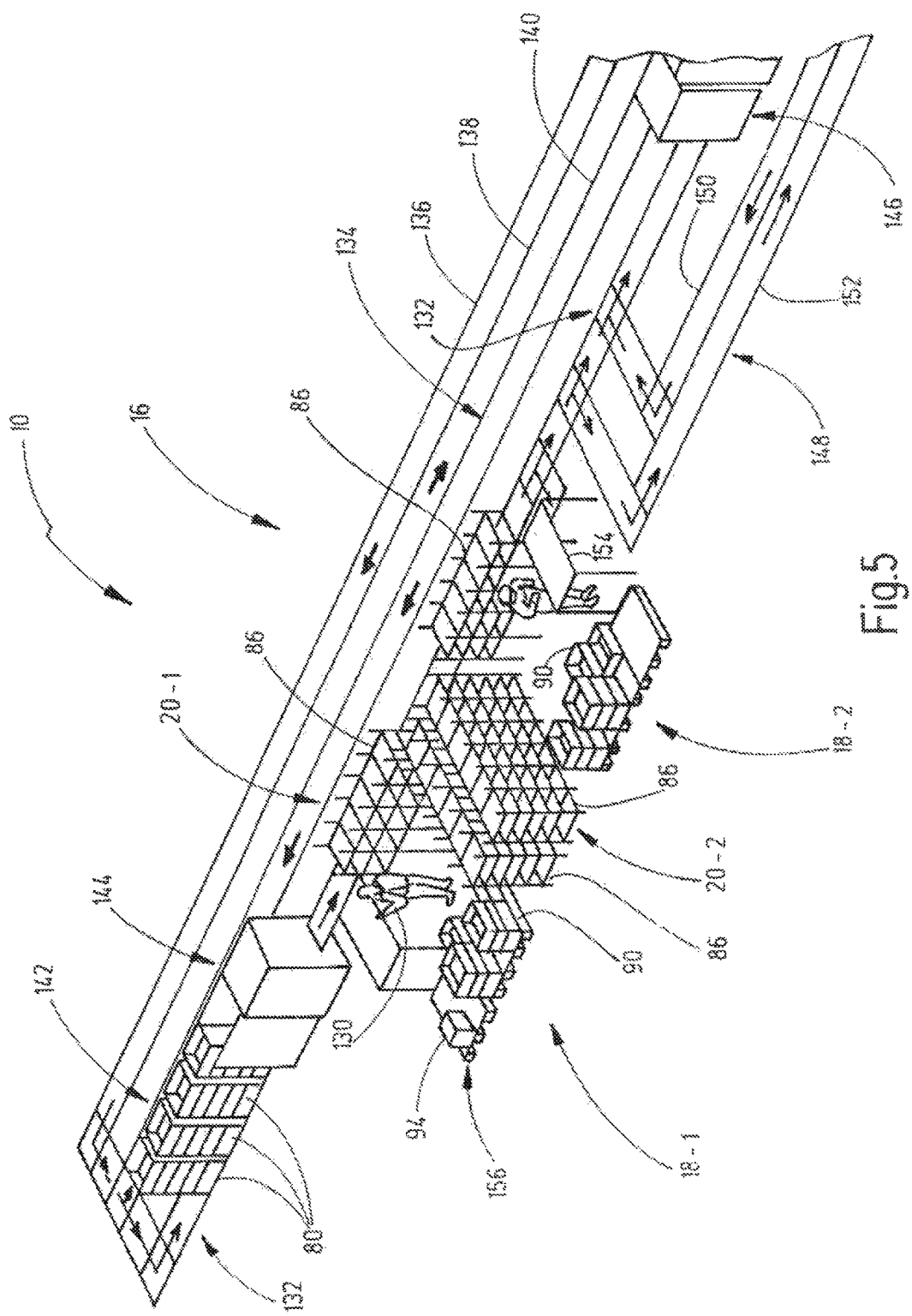
FIG. 5 shows a perspective illustration of a buffer warehouse and two work stations.

FIG. 5 shows a perspective view of a portion of a system 10. In particular, a buffer warehouse 16 and exemplarily two work stations 18-1 and 18-2 are shown where respectively one picking person 130 picks manually from storage containers 80. The work stations 18-1 and 18-2 are arranged locally adjacent to each other and are supplied with the storage containers 80 via a conveying system 132.

In FIG. 5 the buffer warehouse 16 is exemplarily implemented in terms of a conveying-system circle 134, which exemplarily comprises three conveying lines 136-140 being substantially arranged in parallel to each other and being connected to each other at an end side such that the storage containers 80 can circulate endlessly within the conveying-system circle 134. The storage containers 80 are preferably stocked in terms of stacks 142 in the buffer warehouse 16. For the sake of a simplified illustration no (storage) stacks 142 are shown in the region of the conveying-system circle 134. Only at an upstream-located end of the conveying system 132 four stacks 142 are exemplarily shown which are separated by a de-stacking device 144 for being fed individually to the picking persons 130. At a downstream-located end of the conveying system 132 a stacking device 146 is provided for re-stacking the separated storage containers 80, before storage containers 80 are again fed back into the conveying-system circle 134.

If an initial filling, or the replenishment, of the buffer warehouse 16 is performed from the picking warehouse 12 (not shown) in an automated manner, for example, a conveying system 148 is provided which can be connected at an arbitrary location to the conveying-system circle 134, or to the conveying system 132, and which comprises a feeding line 150 and a discharging line 152. In case of manual replenishment the conveying system 148 is not required.

In FIG. 5 each of the work stations 18-1 and 18-2 respectively comprises a table 154 for either repacking the articles 22 (not shown) from the storage containers 80 directly into a shipping container 90 or giving the same into one of the racks 86 (cf. FIG. 4) representing the consolidation-buffer devices 20. However, the articles 22 can also be packed directly. In this case the work stations 18-1 and 18-2 also represent the corresponding packing stations 34 (cf. FIG. 4) at the same time. Completely packed parcels 94 can be packed onto target-load supports (e.g., pallets) 156 which are preferably provided in the region of the work stations 18-1 and 18-2.

Figure 6:
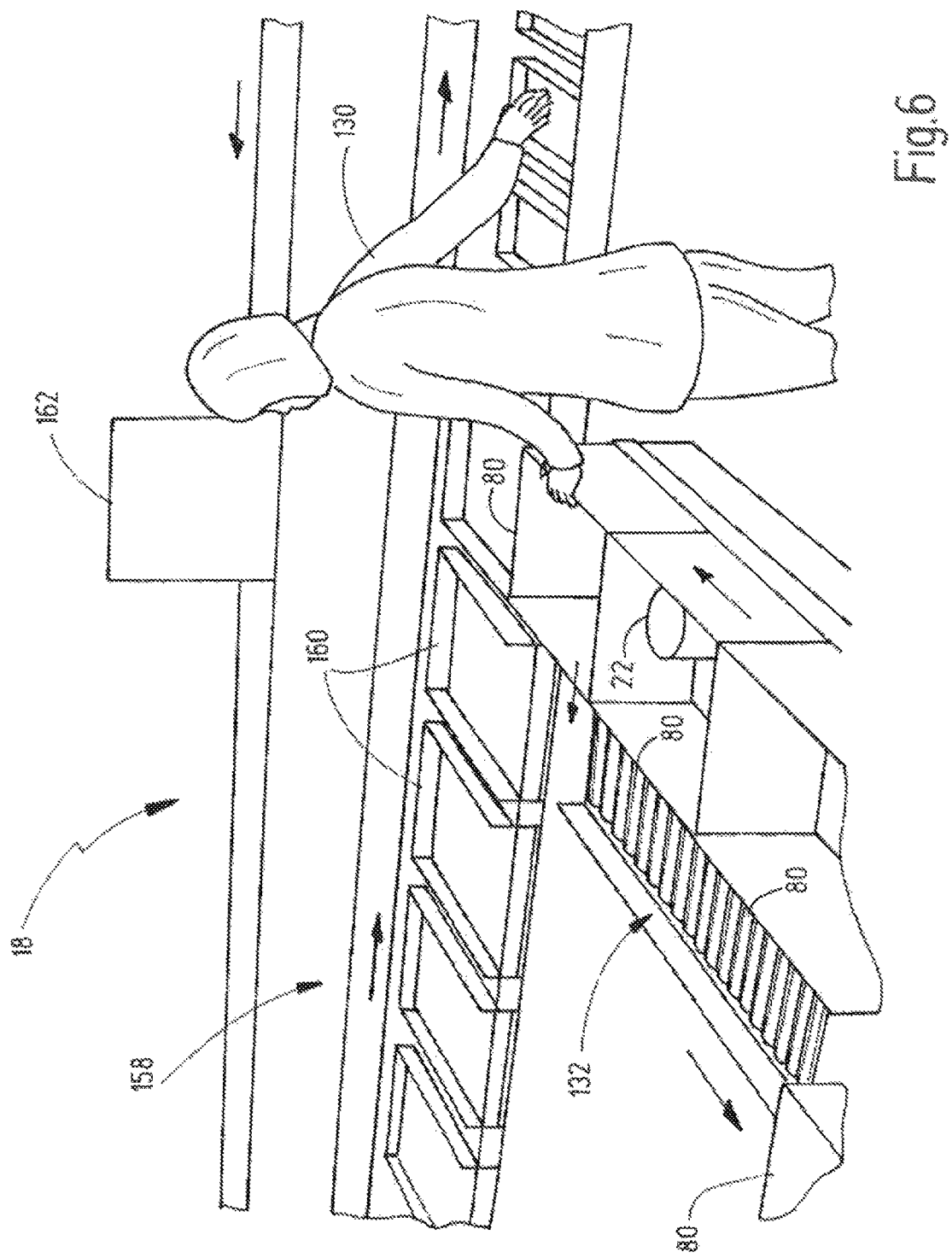
FIG. 6 shows a perspective illustration of a work station having one sorter as a consolidation-buffer device.

FIG. 6 shows a perspective view of a portion of another work station 18 which in turn comprises a conveying system 132 for providing storage containers 80. The consolidation-buffer device 20 is implemented by a sorter 158. The sorter 158 comprises a plurality of sorter trays 160 which are connected in a fixed manner to the endlessly circulating conveying means (not shown). It can be displayed to the picking person 130 via a monitor 162 which quantities are to be retrieved from the storage container 80 respectively standing in line for processing. Further, the article types 46 concerned can be displayed to the picking person 130. Additionally, for example, it can be displayed to the picking person 130 from which of the container compartments the respective article type 46 is to be removed. In FIG. 6 complete storage containers 80 without compartment division are shown. Further, detecting devices (such as scanners, RFID-reading devices, cameras, etc.) can be provided which monitor and register removal of the articles 22 from the storage containers 80 and/or delivery of the removed articles 22 to a respective tray 160. Preferably, the picking person 130 always delivers only one single piece to one single tray of the trays 160. The correspondingly filled trays 160 subsequently move away from the picking person 130 and pass downstream located target locations which are not shown here. Each of the target location has assigned one of the orders 40 so that the articles 22 of one single order 40 can be collected there.

As an alternative to the sorter 158 even a pick-to-bucket arrangement can be used. Exemplary pick-to-bucket arrangements are disclosed in the patent applications DE 10 2004 014 378 A1 and DE 10 2006 057 266 A1.

With reference to FIGS. 7 and 8 selection of the article types 46 and determination of the associated quantities for the buffer warehouse 16 will now be explained.

Figure 7A:
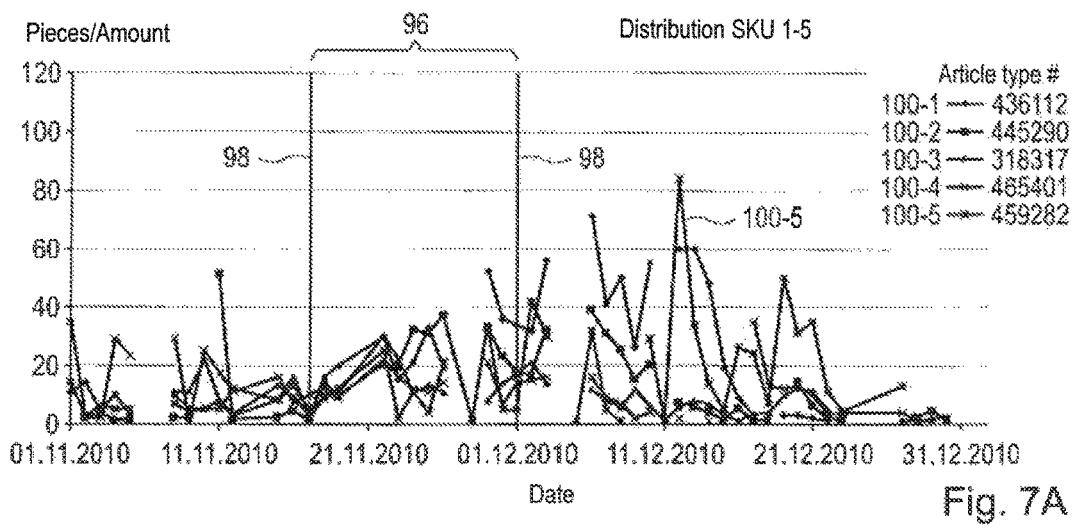
FIGS. 7A-7C show different distributions over longer time periods, wherein Dec. 1, 2010, has been selected exemplarily as a relevant calculation day.
Figure 7B:
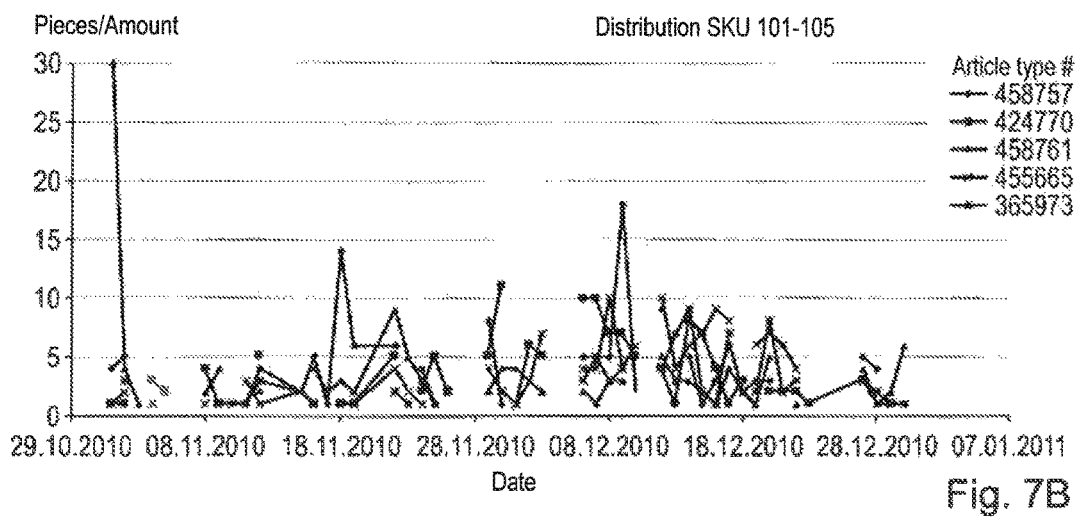
Figure 7C:
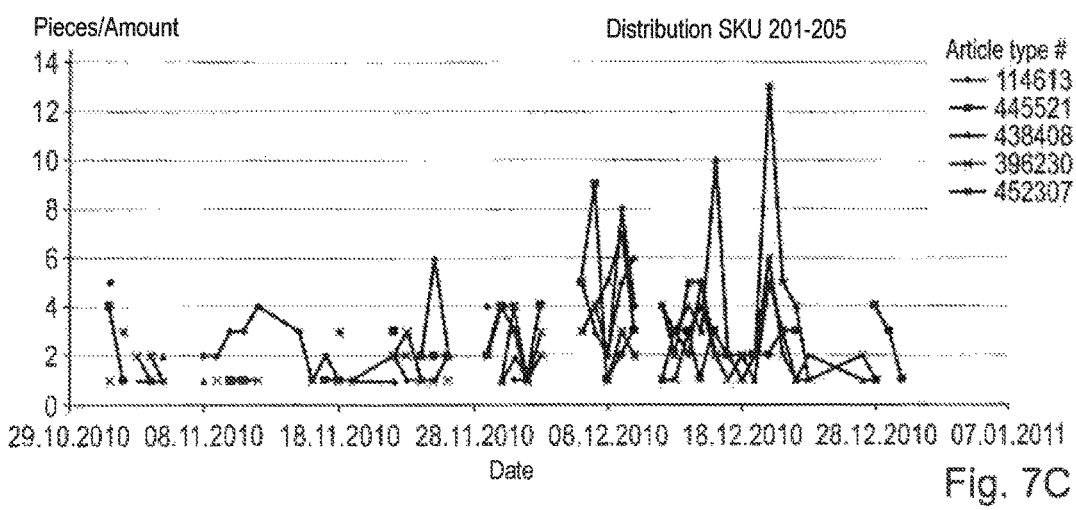

The FIGS. 7A to 7C show different (article type) distributions over longer time periods, wherein Dec. 1, 2010, has been selected exemplarily as a relevant calculation day. The article-type distribution of FIGS. 7A to 7C have been gained from data of old orders for simulating and verifying the concept of the invention arithmetically, i.e. by means of computers. The article assortment 24, which is exemplarily considered for this purpose, comprises about 22,000 different article types 46, if observed over the year. The graphics of FIG. 7A shows five article types 46 ("SKU1-5") which have been sold most frequently and most times in the recent past. In the present case these are the article types having the numbers "436112", "445290", "318317", "465401", and "459282".

In order to determine for the buffer warehouse 16 the article assortment 24 for Dec. 1, 2010, the data of the old orders are preferably evaluated based on the immediate past lying within a time window 96 before Dec. 1, 2010. In the present case a time window 96 have an exemplary size of 14 days is considered. The time window 96 is depicted in FIG. 7A by means of two vertical auxiliary lines 98. The time window 96 extends from Dec. 17, 2010, to Nov. 30, 2010. The time window 96 thus covers two weeks including 11 working days in total (2×5 week days+1×Saturday). Thus, orders were possible on 11 days. The curves 100-1 to 100-5 illustrate the course of the respective article-type distributions. The curves 100 are partially interrupted. Interruptions are always depicted in cases when no order has been put on a possible order day at all. The more continuous and uniform, or more steady, the curves 100 are the more frequently and temporally steady the corresponding article types 46 have been ordered. The higher the amplitudes of the curves 100 are the more quantities of the corresponding article types 46 had been ordered. FIG. 7A shows that the most fast-selling article types 46 have been ordered in a magnitude of 30 to 60 per day (within the time window 96). Nevertheless each of the curves 100 fluctuates heavily so that a mathematical prediction on a future course of the curve (e.g., by means of extrapolation) is impossible.

This heavy fluctuating behavior can also be recognized with article types, which are not that fast-selling, as shown in the FIGS. 7B and 7C. FIG. 7B illustrates the order quantities and order frequencies of the article types 46 which come at the places 101 to 105 of the ranking. FIG. 7C illustrates the places 201 to 205. The daily order quantities in FIGS. 7B and 7C are significantly less than in FIG. 7A.

The temporal size of the time window 96 can be varied. Preferably 14 days are selected. However, more or less days can be selected. The time window 96 is located preferably immediately before the relevant day for which the filling, or the permanently cyclically changing article assortment for the buffer warehouse 16, is determined. It is clear that a temporal distance between the calculation day and the time window 96 is possible. Examinations have resulted in that the buffer warehouse 16 is used the more inefficient the bigger the temporal distance is. In the example of FIG. 4 48.2% of all orders could be served from the buffer warehouse 16. The further the time window 96 is distanced from the calculation day the lesser this percentage number will be.

FIG. 8 shows a table 110 corresponding to the article-type distributions of FIGS. 7A to 7C. The first column represents the calculation day (Dec. 1, 2010) which is identical for each line of the table. The second column of the table 110 represents the respective article type 46. The third column of the table 110 represents a sum total of the quantities, or an overall quantity, which are article-type-specifically ordered within the time window 96. The fourth column of the table 110 represents a number of days on which the respective article type has been ordered respectively. The fifth column of the table 110 represents an order probability. The sixth column of the table 110 represents an arithmetically determined value which expresses significance of selecting the respective article type for being transferred from the picking warehouse 12 into the buffer warehouse 16. The seventh column represents a buffer quantity, and represents how many of the concerned article type are identified in the filling order. It is clear that by such a transfer typically not every piece of the selected article type is transferred from the picking warehouse 12 into the buffer warehouse 16. Typically, only a small quantity of the selected article types is transferred from the picking warehouse 12 into the buffer warehouse 16 because the buffer warehouse 16 has a much smaller capacity and typically has a much smaller picking range as well.

The article types 46 of the table 110 of FIG. 8 (column 2) are arranged top-down, i.e. unsorted, with regard to the significance thereof (column 6). The five article types 46 of FIG. 7A, which temporarily and quantitatively occur most frequently in the time window 96, correspond to the first five lines of the table 110 of FIG. 8.

Hereinafter the first two lines of the table 110 of FIG. 8 will be considered in more detail. The first line relates to the article type "445290". The article type "445290" was ordered on 11 days of 11 possible days in the time period of Nov. 17, 2010, to Nov. 30, 2010. Therefore, the order probability (column 5) is 100%. In total 215 pieces of the article type "445290" were ordered in the relevant time period, as illustrated in the third column. The value "1720" (column 6) is determined by the product of the quantity sum (215) and the order days (11) minus a threshold value (3) of days when the corresponding article type must have been ordered actually within the time window 96 (215×(11−3) =1720). This threshold value can be selected arbitrarily. In the present example the corresponding article type thus must have been ordered on more than three days within the time window 96 in order to be considered with the evaluation, or with the generation, of the table 110.

The second line of the table 110 relates to the article type "436112" which was ordered in total 234 times, namely on 10 of 11 possible days so that the order probability is 91% (10/11=0.91). In accordance with the above given calculation method this results in a significance "1638" (234×(10−3)=1638).

The first two lines of the table 110 thus express that although the article type "436112" was ordered, with regard to quantity, more frequently than the article type "445290" the fact that the order probability of the article type "445290" is greater than the order probability of the article type "436112" has more weight. An article type 46 which is required each day should be present in any case in the assortment of the buffer warehouse 16.

The number of the article types 46 which can be selected for the assortment of the buffer warehouse 16 depends amongst other things on the physical size of the articles 22 as well as on the physical size of the buffer warehouse 16. The selection of the dimension of the buffer warehouse 16 will be explained in more detail below. Additionally, the article types 46 having a small order probability are completely removed from the table 110 because otherwise high, but very unlikely, quantities of these buffer types 46 were received by the buffer warehouse 16 (e.g., special-offer articles which are no longer in the special-offer phase, or sale of remaining quantities, etc.). Further, article types 46 can be excluded or limited which fall beneath or exceed a pregiven storage quantity due to their volume or weight, in order to prevent inefficient storing-in processes.

The (buffer) quantities of the article types 46 selected for the buffer warehouse 16 depend on the picking range of the buffer warehouse 16. An average order quantity per day can be considered as another parameter. The buffer quantity of the column 7 of the table 110 corresponds to the product of an average order quantity (quotient of sum and actual days of the order) and the (configurable) picking range. In the table 110 the 7th column was calculated based on a picking range of 2 days for the buffer warehouse 16. Hence, the article type "445290" of the first column of the table 110 is arithmetically stored with 39.1 pieces into the buffer warehouse 16 for the calculation day Dec. 1, 2010.

With the sortation of the lines of the table 110 additional parameters such as the volume, the dimension, and the weight of the concerned article type 46 can be further considered additionally and/or alternatively. Further, threshold values can be defined for these parameters in turn. An article type 46, which is specifically heavy or huge, rather should not be transferred into the buffer warehouse 16 because it complicates the picking process ergonomically since the space in the buffer warehouse 16 is very limited in comparison to the space in the picking warehouse 12.

Figure 11:
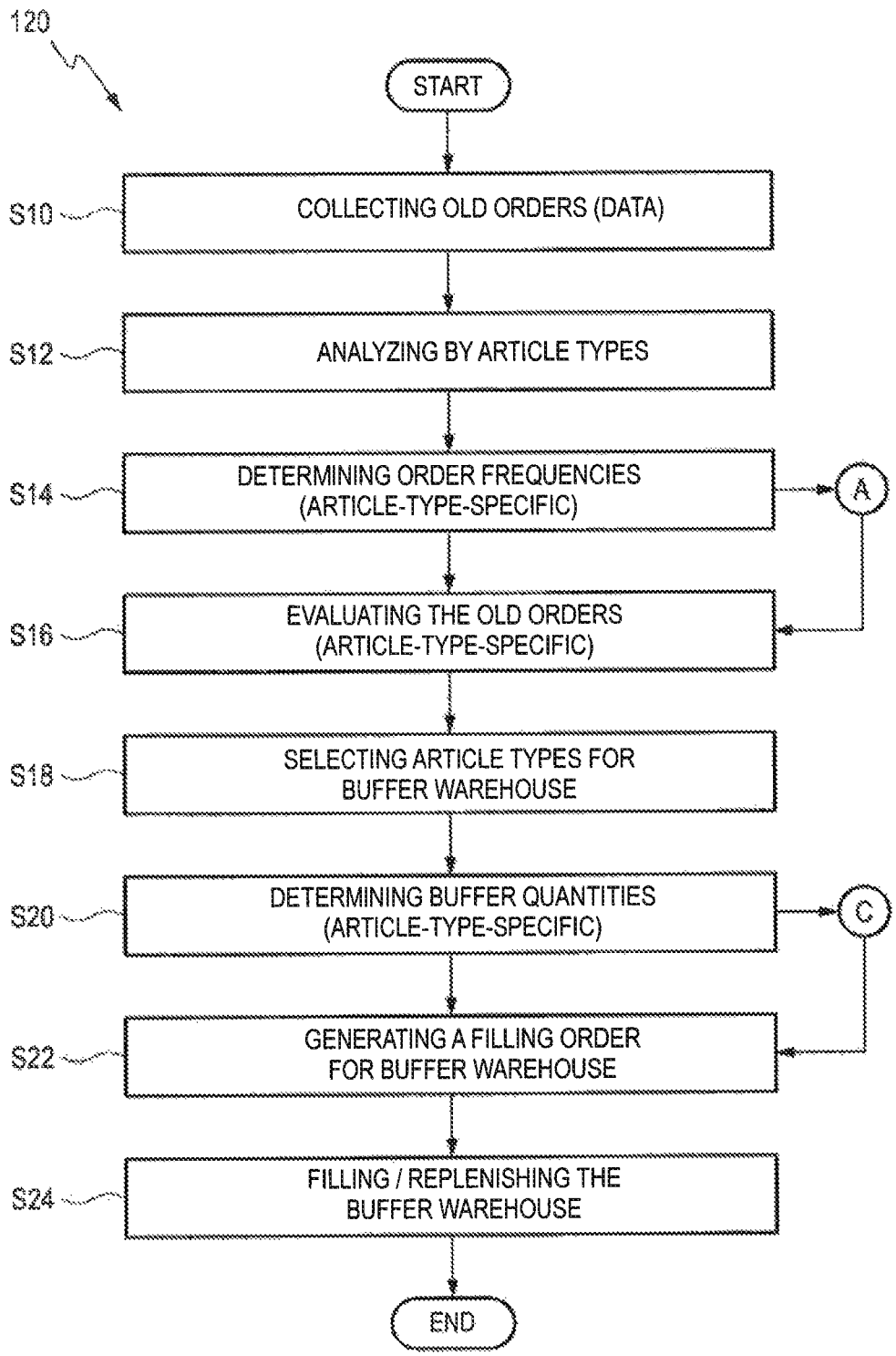
FIG. 11 shows a flow chart for generating a filling order for the buffer warehouse.

From the buffer quantities of the column 7 of the table 110 of FIG. 11 container-compartment divisions can be determined based on the volume and the weight of the article type 46 concerned. In the present case it is exemplarily assumed that each of the storage containers 80 has the same size and further is formed dividable. The storage container 80 can have, for example, the standard dimensions 500×600×400 and thus defines a maximum overall volume. The containers 80 can be divided optionally, for example, into 2, 4, 6, or 8 compartments. Small compartment divisions are always selected in cases when the to-be-stored article types 46 have a small volume. A few up to no compartment divisions are selected if the selected article types 46 have huge volumes and/or weights.

In addition, threshold values for the maximum number of storage containers 80 can be defined which are occupied by one and the same article type 46 in the buffer warehouse 16. Further, rules can be defined primarily allowing an increasing of the calculated buffer quantity (cf. column 7 of the table 110 of FIG. 8) to a quantity, which is possible at maximum, for the selected container compartment. In order to avoid that disproportionally high quantities are transferred into the buffer warehouse 16 by means of the increase additional threshold values for maximum rounding-up can be defined. Thus, for example, it has been found advantageous if not more than five times of the calculated buffer quantity is transferred into the buffer warehouse 16.

The picking range of the buffer warehouse 16 is preferably selected such that after the expiry of one cycle the articles 22, which are located in the buffer warehouse 16, are almost consumed. Preferably, the assortment for the buffer warehouse 16 is determined a newly each day. Then the cycle is one day. Optionally, the buffer warehouse 16 can also be filled more often on the same day, wherein the cycle duration is correspondingly smaller in this case. In this case the buffer warehouse 16 is re-filled, i.e. replenished, every day so that the desired assortment is achieved which is new every day. Storing-back processes from the buffer warehouse 16 into the picking warehouse 12 are not desired and are only performed in an exceptional case. For this purpose, for example, a maximum lifespan can be defined which determines how long one of the article types 46 may stay at maximum in one of the storage containers 80, without the corresponding container 80 being re-filled or filled newly.

Preferably, the (arithmetically determined) buffer quantities are increased to full compartments or entire containers 80. The "adapted" buffer quantity can be indicated in a further (eighth) column (not shown). Also, the adapted buffer quantity can consider remaining stocks of the corresponding article type of the preceding cycle (e.g., difference of arithmetically determined buffer quantity and actual remaining quantity). The number of the required container compartments, or containers, is determined in advance based on the volume and weight of the corresponding article type 46.

Figure 9:
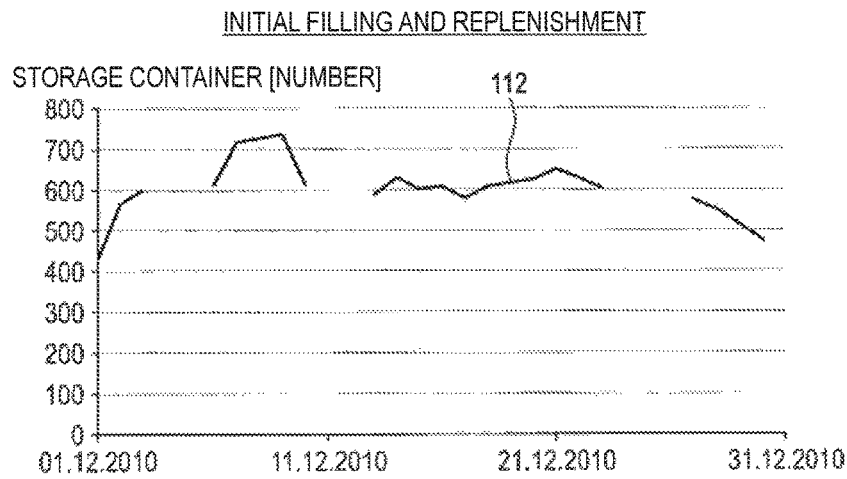
FIG. 9 shows a course of a number of storage units, which are required for the buffer warehouse, in accordance with data from the past for the purpose of determination of a physical size of the buffer warehouse.

FIG. 9 shows a course 112 of a number of storage units (daily) required in the buffer warehouse 16 at an initial filling of the buffer warehouse 16 on Dec. 1, 2010. FIG. 9 serves for illustrating the determination of a storage capacity of the buffer warehouse 16. The storage capacity generally expresses how many articles 22 of a specific article type 46 can be stored within one of the warehouses 12 or 16.

As before, it is assumed that uniform storage containers 80 are exemplarily used for stocking the articles 22 in the buffer warehouse 16. Further, the course 112 was determined under the presumption that the buffer warehouse 16 comprises the 500 most-frequent article types 46 of the article assortment 24 which includes in total about 22,000 different article types 46 in this case. It is clear that more or less than 500 article types can be selected. The selection depends amongst other things on the size of the overall article assortment 24, the vendor-specific order structure 84, the selected picking range, and the like.

For storing the articles 22 of the table 110 of FIG. 8 on Dec. 1, 2010 into the buffer warehouse 16 roughly 450 (standard) storage containers 80 are required. On Dec. 2, 2010, the same procedure is performed, as described above, in order to determine the assortment of the buffer warehouse 16 for the calculation day of Dec. 2, 2010. This assortment dedicated to Dec. 2, 2010, can be compared to the remaining quantity of the assortment of Dec. 1, 2010, for determining a supply required for having the articles 22 in the buffer warehouse 16 which are desired for Dec. 2, 2010. The number of storage containers increases to roughly 600.

In the same manner the container numbers required for the days Dec. 3 to Dec. 31, 2010, are determined such that the course 112 results for the month December 2010. The course 112 is partially interrupted. This can be explained by days on which the system 10 is not operated (e.g., Sundays, etc.). The course 112 of FIG. 9 results in an average number of roughly 600 storage containers which are required for filling the buffer warehouse 16 in a satisfying manner.

It is clear that the absolute number of storage containers and the course 112 heavily depend on the general order structure 84 of the corresponding vendor. Also, the field of business, in which the vendor is operating, can be important. Depending on the amount of old orders present the time period (in FIG. 9 the month December 2010 is considered) can be extended or shortened. It is recommendable to determine the dimension of the buffer warehouse 16 in time periods when the system is subjected to peak loads such as the Christmas business.

Figure 10:
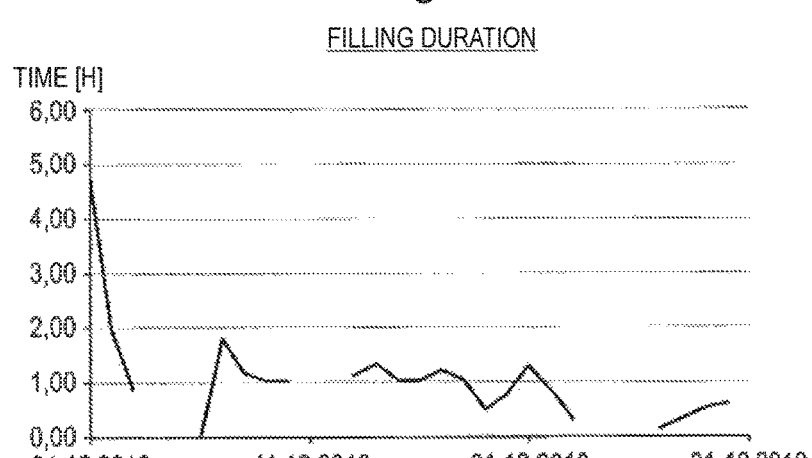
FIG. 10 shows a course of a duration required for filling the buffer warehouse.

FIG. 10 shows a filling period calculated for filling, or replenishing, the number of containers of FIG. 9 on a daily basis. It can be recognized that on the day of the initial filling, i.e. on Dec. 1, 2010, roughly 5 hours are required for the filling of each of the 450 storage containers 80. After that the filling period decreases drastically (factor 4-5).

FIG. 11 shows a flow chart of a method 120 for determining and generating a filling order for the buffer warehouse 16. The description of FIGS. 7 and 8 is to be considered additionally.

In a first step S10 data of old orders are collected. These data can be provided by the vendor and relate to picking orders 40 which were already completed in the past. The old orders provide, amongst other things, information on the general order structure 84 of the vendor.

In step S12 the data of each of the old orders is analyzed with regard to, or by, contained article types 46. The article types 46 typically correspond to the order lines 42. Thus, an overview on the variety of the order types 46 within the time window 96 is obtained. The second column of the table 110 of FIG. 8 can be determined in this way.

Then, in step S14 article-type-specific order frequencies can be determined with regard to both a number of pieces/quantity (cf. column 3 of the table 110 of FIG. 8) and an order frequency, or order probability, (cf. columns 4 and 5 of the table 110 of FIG. 8). It can be selected freely whether the quantitative order frequency or the temporal order frequency (order probability) is determined at first. Also, the determination can conducted in parallel.

In general the determination of the article types and the corresponding quantities for the buffer warehouse 16 does not need to be performed column-by-column but can also be performed, for example, line-by-line.

In step S16 the old orders are evaluated in an article-type-specific manner. For example, the column 6 of the table 110 of FIG. 8 is determined in the manner described there. The evaluation step S16 also includes the arranging, or sorting, of the lines of the table 110 of FIG. 8 (increasingly, decreasingly, etc.). The steps S12 to S16 are performed for each of the article types 46 contained in the data of the old orders. In this context the threshold values mentioned in the context of FIG. 8 can be considered additionally.

In step S18 specific article types 46 are selected for the buffer warehouse 16 which were ordered in the past frequently and in huge quantities, for example, the 500 article types 46 having the highest significances (column 5 of FIG. 8). The number of the article types 46, in the present case 500, can vary cycle-by-cycle, in particular dependent on the filling grade of the buffer warehouse 16 and assortment composition.

In the step S18, optionally, also article types 46 can be selected additionally which were not contained in the analysis of the step S12 but have a step-like increased order probability due to a current event (of the day). For example, if bad weather is predicted for the next day umbrellas and/or handkerchiefs can be added to the assortment of the buffer warehouse 16 by selection of the corresponding article types 46 even if umbrellas and handkerchiefs did not have significant relevances within the time window 96. In this case the operator can decide to exchange, a preferably very small, part of the assortment, which is only determined by the above-described algorithm, against the umbrellas and/or handkerchiefs. Preferably, in this case selected article types 46 having smaller significances are exchanged. A similar action could be performed for an article of a spontaneous advertisement action, in order to name a further example.

After it has been determined in the step S18 which of the article types 46 have been selected for filling the buffer warehouse 16, in step S20 the buffer quantities are determined in an article-type-specific manner (cf. column 6 in FIG. 8, arithmetical buffer quantity). This step can also include the above described increase to load support compartments or entire load supports, which results in a further column of the table 110 of FIG. 8 which is not shown there (actual buffer quantity, dependent on storage container and compartment division).

Then, in step S22 the current filling order is generated for the buffer warehouse 16. In particular, the filling order comprises the information of the columns 2, 7, and/or 8 of the table 110 of FIG. 8. The filling order can be converted in the picking control 30 into corresponding transport and repacking orders (see warehouse management 62, material-flow control 64, and location administration 66 of FIG. 3).

In step S24 the buffer warehouse 16 is then correspondingly filled initially, or replenished.

Figure 12:
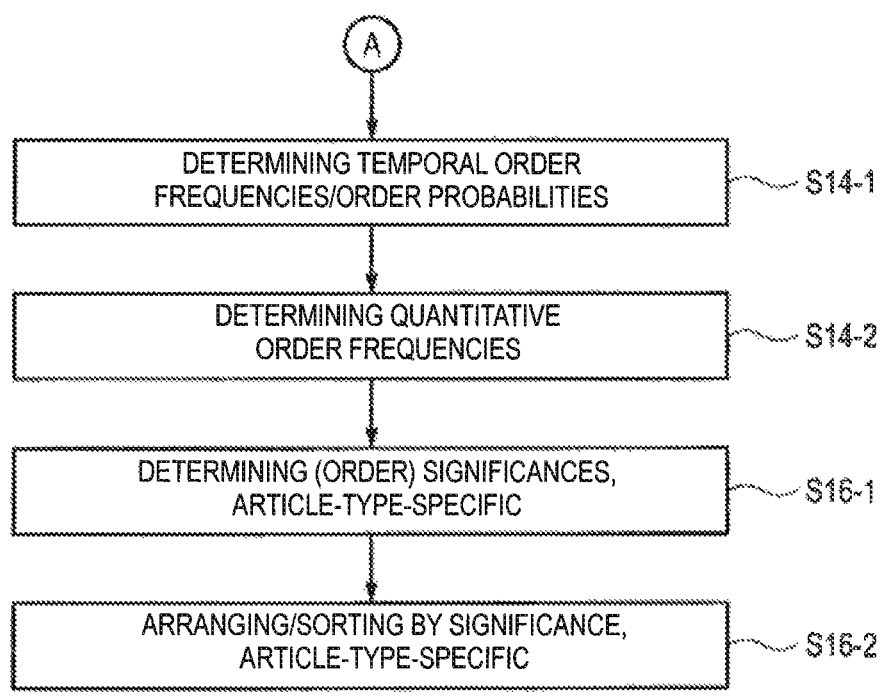
FIG. 12 shows steps in detail related to the diagram of FIG. 11.

The flow chart of FIG. 12 serves for the illustration of the steps S14 and S16 of the flow chart 120 of FIG. 11 as indicated by a bypass "A" in FIG. 11.

The step S14 of FIG. 11 can be divided into the steps S14-1 and S14-2 which are shown in FIG. 12. In the step S14-1 the temporal order frequencies, or probabilities, are determined. In the example of FIG. 8 this means that it is determined on how many days a specific article type 46 is actually ordered. Typically this is performed by quotient generation of the values "order frequency in days" and "overall number of possible order days". In the step S14-2 the quantitative order frequencies are determined, which is conducted in FIG. 8 by summing each of the orders within the time window 96 as expressed by the third column of the table 110 of FIG. 8.

In the step S16-1 the significances of the column 6 of the table 110 of FIG. 8 are determined, namely in an article-type-specific manner. Subsequently, the article types are evaluated in the step S16-2 by arranging, or sorting, the significances in an article-type-specific manner.

Figure 13:
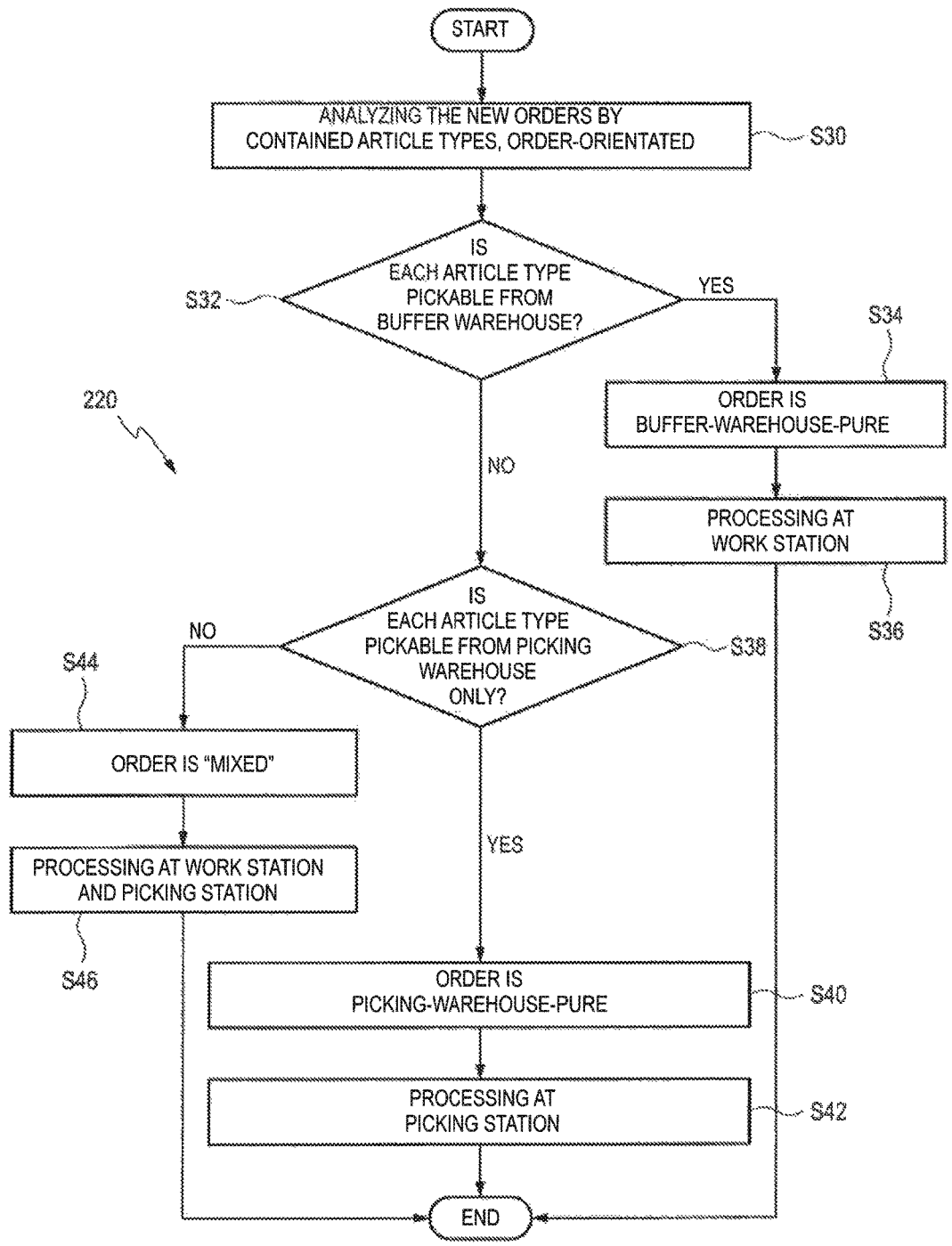
FIG. 13 shows a flow chart of a picking method.

The FIG. 13 shows a flow chart of a picking method 200. The picking method 200 illustrates in which manner and at which stations the orders 40, which have not been processed yet, are processed in a system 10 according to the invention.

The actual picking process is built on an order-orientated analysis of the new orders with regard to the respectively contained article types 46 (step S30). Thus, the picking control 30 analyzes the new orders in an order-orientated manner with regard to the article types 46 contained. Thus, it is clear which of the orders 40 contains which of the article types 46.

In a step S32 it is inquired in an order-orientated manner whether each of the article types 46, which are contained in a respective order 40, can be picked by articles 22 being stored in the buffer warehouse 16. If each of the article types 46 of the respective order can be picked from the buffer warehouse 16 a "buffer-warehouse-pure" order 40 is present. In this case the order 40 is classified as a buffer-warehouse-pure order 40 (step S34), and subsequently processed at the work station(s) 18 (step S36).

If the inquiry of the step S32 results in that not every article types 46 can be picked from the buffer warehouse 16, it is inquired in step S38 whether each of the contained article types 46 can be picked exclusively from the picking warehouse 12. The contained article types 46 in this case cannot be picked from the buffer warehouse 12 if the quantity of the corresponding article type 46 being present in the picking buffer 16 is not sufficient for processing the corresponding order 40 completely, or if the corresponding article type 46 is not present at all within the buffer warehouse 16. If the inquiry of the step S38 results in that each of the contained article types 46 can be picked exclusively from the picking warehouse 12 the corresponding order 40 is classified as "picking-warehouse-pure" order 40 (step S40), and subsequently processed at the picking station(s) 18 (step S42).

However, if the inquiry of the step S38 results in that not each of the contained article types 46 can be picked exclusively from the picking warehouse 12, a logical consequence of the inquiries of the steps S32 and S38 is that a "mixed" order 40 must be present. The corresponding classification is performed in the step S44. The processing of the mixed order 40 occurs at the work station(s) 18 or the picking station(s) 14 (step 46).

It is clear that, alternatively to the inquiries of the steps S32 and S38 it could be inquired (step not depicted) whether the corresponding order 40 comprises both article types 46 which are stocked in the picking warehouse 12 only and article types 46 which are also stocked in the buffer warehouse 16.

Further, after the classification of the order 40 in accordance with the step S34 ("buffer-warehouse-pure"), it could be inquired whether a single-line order 40 or a multi-line order 40 is present. The multi-line orders 40 require processing which involves the consolidation buffer 20 (cf. FIG. 4). The single-line orders 40 can be directly, i.e. without temporal delay and interconnected buffering steps, completed, i.e. repacked, collected and/or packed.

In the following some of the advantages of the invention will be considered in more detail.

A big advantage is to be seen in the increase of the picking efficiency, or picking performance (completed orders/time), which is linked, due to the pre-picking process or the manner of filling (assortment) of the buffer warehouse 16, to article types 46 which were particularly frequently required in the past.

Figure 14:
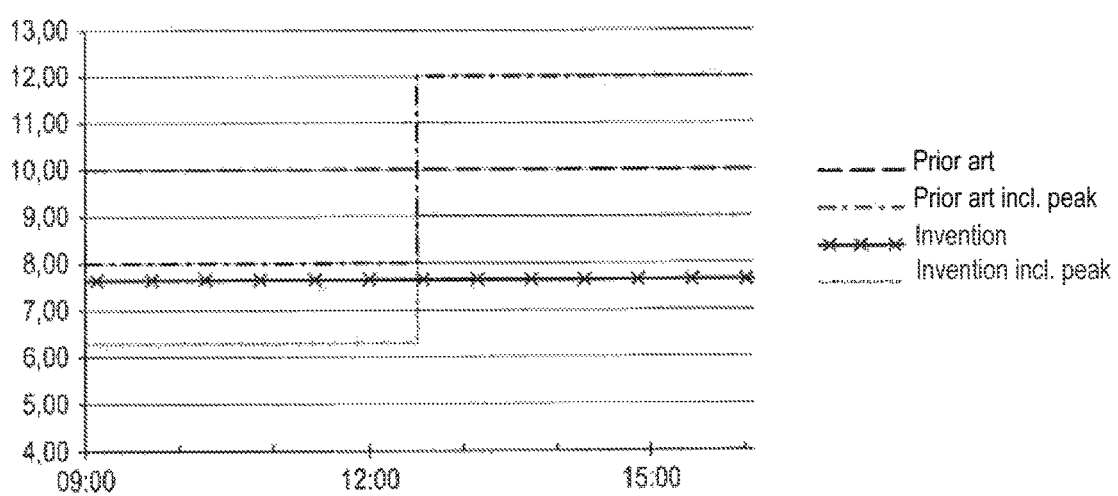
FIG. 14 shows a comparison of required working hours.

FIG. 14 shows a diagram where a number of employees is depicted against day time, wherein the constellation considered in FIG. 4 was taken as a basis. In a conventional system where the buffer warehouse 16 is lacking and the picking process is performed exclusively from the picking warehouse 12, 10 employees, over the entire day, are required for coping with the amount of work involved (PA, prior art). This is indicated in FIG. 14 by means of a dashed line. If one considers with such a conventional system additional peak loads, which typically occur in the afternoon or in the evening, then the dot-dashed course (prior art including peak) results. In this case typically 8 employees are required in the morning time for completing the work involved, and roughly from 0.30 p.m. on even 12 employees are required. In accordance with the invention, upon identical requirements, 8 employees less are constantly required (cf. curve "invention") in case of the uniform load. In case of an unequal distribution of the capacity utilization somehow more than 6 employees are required in the morning and about 9 employees are required in the afternoon ("invention including peak"). It can be clearly recognized that less employees are required with the invention for completing the same amount of work involved. This means that the system 10 of the invention operates more efficiently.

With the present invention the amount of work involved (picking and/or filling) is shifted to such time phases during which the system 10 is less used with regard to capacity utilization in total, such as during the morning time.

Also, due to the present invention performance increases of up to 20 to 30% can be achieved compared to conventional solutions. Employee costs can be lowered, or at constant employee effort more orders 40 can be coped with. This increase is achieved mainly in systems where picking is performed in accordance with the goods-to-man principle.

Investments in bigger (conventional) systems are not required. Existing systems can be extended by the work station 18 and the buffer warehouse 16 for implementing the invention.

Another advantage is to be seen in that, with an increased turnover, performance peaks do not need to be covered in short term by increased staff utilization. The staff utilization (who works when and where?) does not need to be controlled any more. Thus, the short term employment of loan workers, for example, is omitted. This aspect is important because there are great performance differences between original staff and loan workers.

LIST OF REFERENCE NUMERALS

| | |
|---|---|
| 10 | Storage and picking system |
| 12 | Picking warehouse |
| 14 | Picking station |
| 16 | Buffer warehouse |
| 18 | Work station |
| 20 | Consolidation-buffer device |
| 22 | Article |
| 24 | Article assortment |
| 26 | Article flows |
| 28 | Goods receipt |
| 30 | Picking control |
| 32 | Packing station |
| 34 | Storage and picking region |
| 36 | Packing and shipping region |
| 40 | (Picking) order |
| 42 | Order position/order line |
| 44 | Quantity/number of pieces |
| 46 | Article type |
| 48 | Data set |
| 50 | Header field |
| 52 | Priority field |
| 54 | Article field |
| 56 | Order administration |
| 58 | Resource planning system |
| 60 | Picking-guidance strategy |
| 62 | Warehouse management |
| 64 | Material flow |
| 66 | Location administration |
| 68 | I/O administration |
| 70 | Lines |
| 72 | Wireless communication |
| 80 | Storage container |
| 82 | Order block |
| 84 | Order structure |
| F1, F2 | Factors |
| 86 | Rack |
| 88 | Rack compartment |
| 90 | Shipping containers |
| 92 | Block |
| 94 | Parcel |
| 96 | Time window |
| 98 | Auxiliary lines |
| 100 | Distribution |
| 110 | Table |
| 112 | Course of number of containers |
| 120 | Method for determining a filling order |
| 130 | Picking person |
| 132 | Conveying system |
| 134 | Conveying-system circle |
| 136-140 | Conveying lines |
| 142 | Stack |
| 144 | Stacking device |
| 148 | Conveying system, optional |
| 150 | Feeding line |
| 152 | Discharging line |
| 154 | Table |
| 156 | Target-load support |
| 158 | Sorter |
| 160 | Trays |
| 162 | Monitor |
| 200 | Method for picking |

The invention claimed is:

1. A storage and picking system for progressive picking of articles in accordance with new orders, which define the ordered articles by a respectively ordered article type including an associated quantity, wherein the storage and picking system comprises:
   a picking warehouse in which a plurality of articles of different article types are stored, the stored articles forming an article assortment for the picking, wherein the picking warehouse has a storage capacity ensuring a picking range of several days;
   a picking station for picking the articles which are stored in the picking warehouse;
   a buffer warehouse in which selected article types are stored and which has a storage capacity ensuring a picking range of a few days, wherein the buffer warehouse is filled with the selected article types, which substantially originate from the picking warehouse, in accordance with a filling order being cyclically redetermined based on data of old orders, which old orders represent completed picking orders from the past, and the filling order defining the selected article types including associated quantities of the selected article types, wherein the data of the old orders comprise ordered article types including associated quantities as well as associated order times;
   a picking control; and
   at least one work station and a consolidation-buffer device, wherein the work station is connected, in terms of material flow, to the buffer warehouse, and wherein the ordered articles, at the work station, are taken and packed, or are taken and delivered to the consolidation-buffer device;
   wherein the picking control is configured for cyclic generation of the filling order, wherein the generation of the filling order comprises the following steps:
   selecting the article types for the buffer warehouse, which have been ordered frequently and in greater amounts in the past, from the data of the old orders;
   determining an article-type-specific buffer quantity for each of the selected article types; and
   generating the filling order which defines the selected article types including associated buffer quantities thereof; and
   wherein the picking control is further configured to classify the new orders into buffer-warehouse-pure, mixed, and picking-warehouse-pure new orders, wherein the buffer-warehouse-pure and mixed new orders are processed at the work station, and wherein the picking-warehouse-pure new orders are processed at the picking station.

2. The system of claim 1, wherein the picking control is configured to select the article types by:
   determining the different article types included in the data of the old orders;
   for each of the article types included in the data of the old orders determining a temporal order frequency and a number of order-time units during which order-time units orders had been possible;
   for each of the article types included in the data of the old orders determining a quantitative order frequency;
   arranging the different article types in accordance with at least one of temporal order frequencies and quantitative order frequencies; and
   selecting the article types which occur at least one of temporally and quantitatively the most frequently.

3. The system of claim 1, wherein the picking control is configured to effect cyclic generation of the filling order by:
   determining a distribution of article-type-specific buffer quantities on storage units.

4. The system of claim 3, wherein the picking control is configured to determine the distribution of the article-type-specific buffer quantities on the storage units by considering article-type-specific volumes and weights as well as storage-unit-specific dimensions.

5. The system of claim 1, wherein the picking control is configured to effect cyclic generation of the filling order by:
   exchanging a small part of the selected article types for article types having an increased ordering probability which increase has increased in a stepped manner due to a current event.

6. The system of claim 1, wherein the picking control is configured to determine the article-type-specific buffer quantities for the selected article types by multiplying article-type-specific average order quantities by the picking range of the buffer warehouse.

7. The system of claim 1, wherein the buffer warehouse comprises a fixed physical size which corresponds to a fixed number of storage units which are receivable at maximum by the buffer warehouse.

8. The system of claim 1, wherein the buffer warehouse comprises a storage-unit storage device.

9. The system of claim 1, further comprising a packing station.

10. The system of claim 1, wherein a filling-order generation cycle is one day.

11. The system of claim 1, wherein the consolidation-buffer device is one of a shelving, a flow rack, a pick-to-bucket arrangement, and a circulating sorter which comprises a picking-guidance system.

12. The system of claim 1, wherein the picking control is further configured to perform at least one of a storage-location administration, a picking guidance, and an order administration, and is configured to cause filling of the buffer warehouse by the articles of the selected article types.

13. A method for progressive picking of articles in accordance with new orders in a storage and picking system comprising: a buffer warehouse; a picking warehouse; a work station; and a consolidation-buffer device, wherein the warehouses respectively hold articles of different article types; wherein the method comprises the following steps:
   analyzing a plurality of new orders with regard to article types included;
   classifying the analyzed new orders into:
      buffer-warehouse-pure new orders including only article types which are stored in the buffer warehouse;
      mixed new orders including the article types which are stored in the buffer warehouse and in the picking warehouse; and
      picking-warehouse-pure new orders including the article types which are stored in the picking warehouse only;
   at the work station order-orientated processing of the article types which are stored in the buffer warehouse and which are included in the buffer-pure and mixed new orders by removing for the purpose of direct subsequent packing, or by removing and order-orientated collecting in the consolidation-buffer device;
   order-orientated removing the article types included in the mixed new orders and being stored in the picking warehouse only, and order-orientated merging with the corresponding article types from the work station; and
   processing the picking-warehouse-pure new orders by removing the article types from the picking warehouse for the purpose of direct subsequent packing.

* * * * *